June 2, 1964 F. KALWAITES 3,135,023
METHOD AND APPARATUS FOR MAKING STRANDS, YARNS, AND THE LIKE
Filed June 27, 1958 9 Sheets-Sheet 5
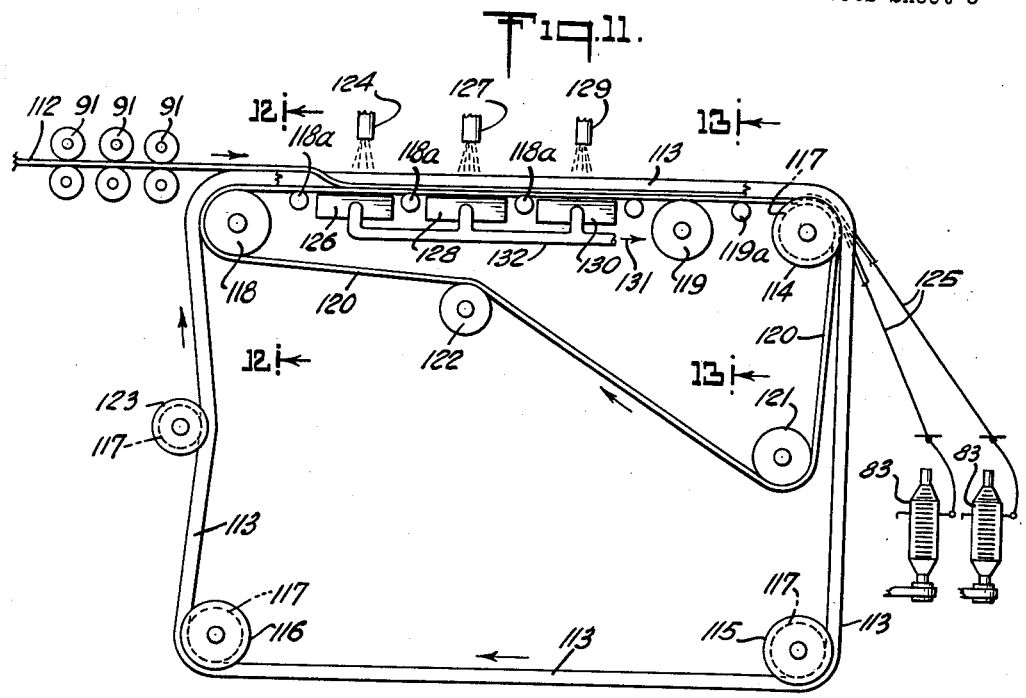
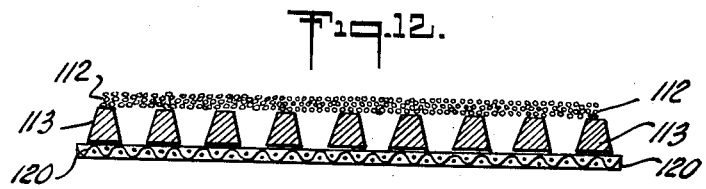
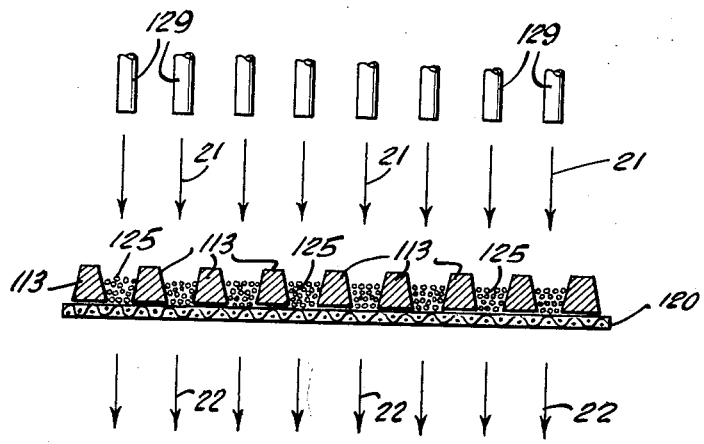
INVENTOR
FRANK KALWAITES
BY
Alexander T. Kardos
ATTORNEY

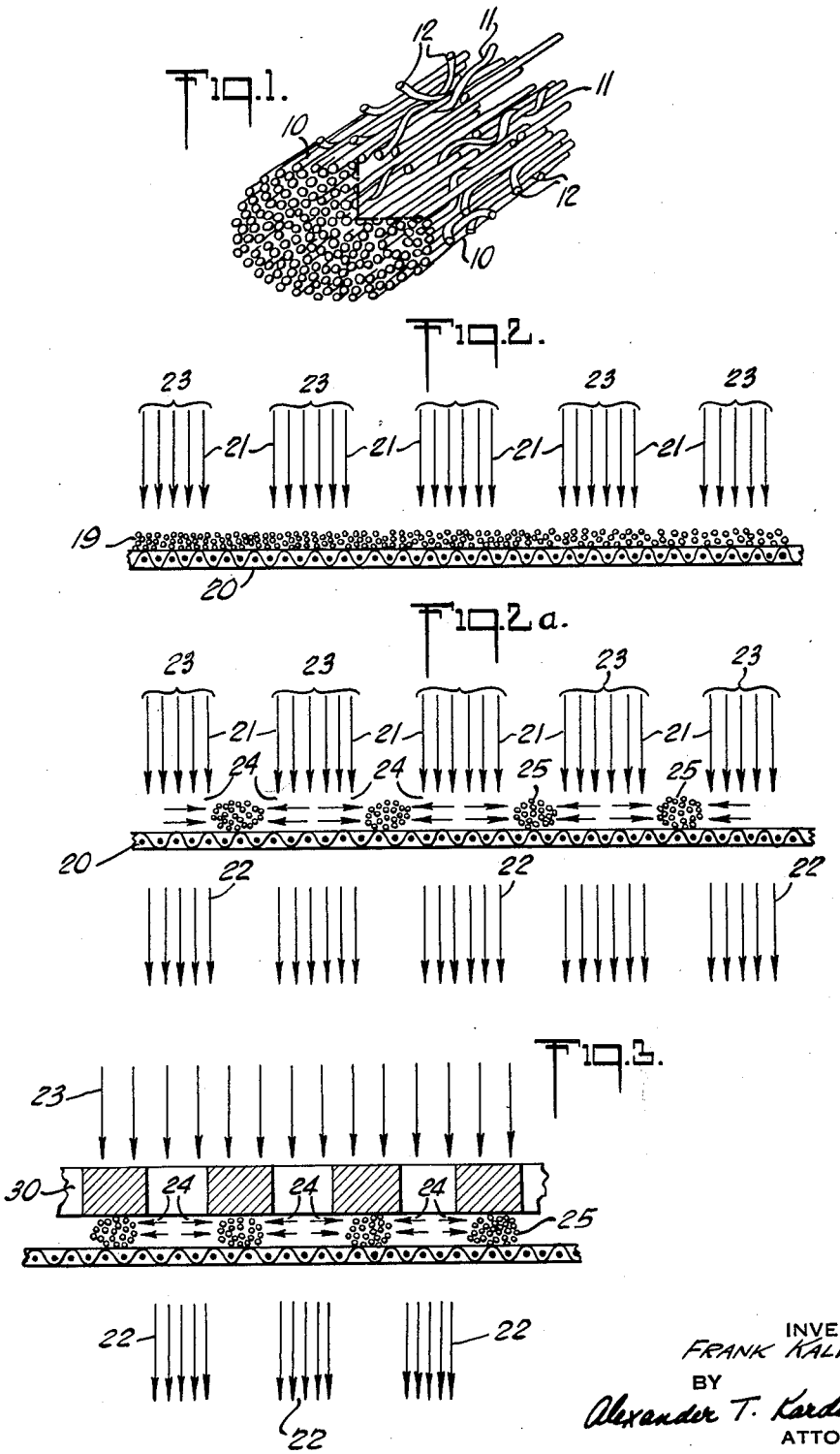

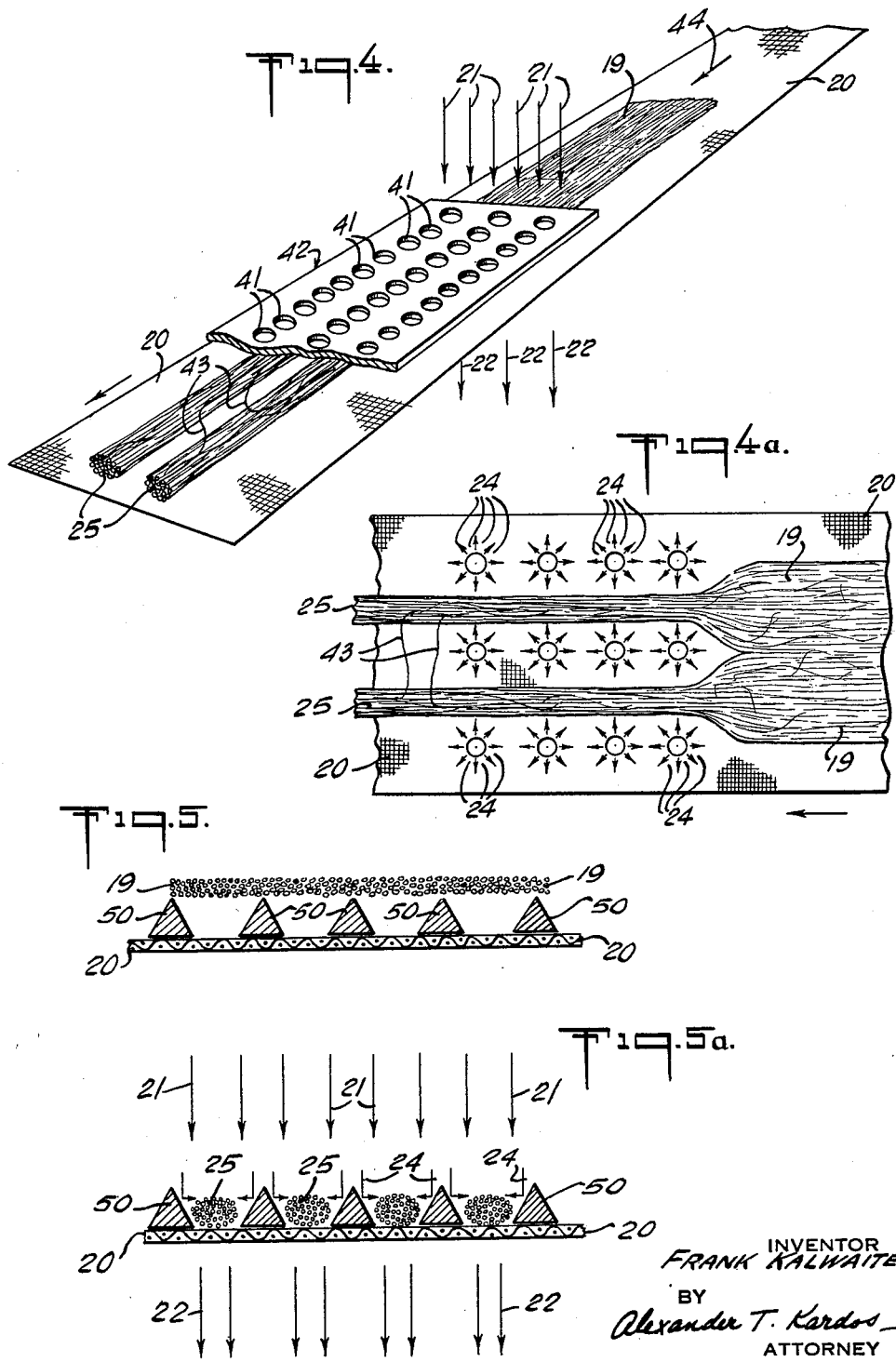

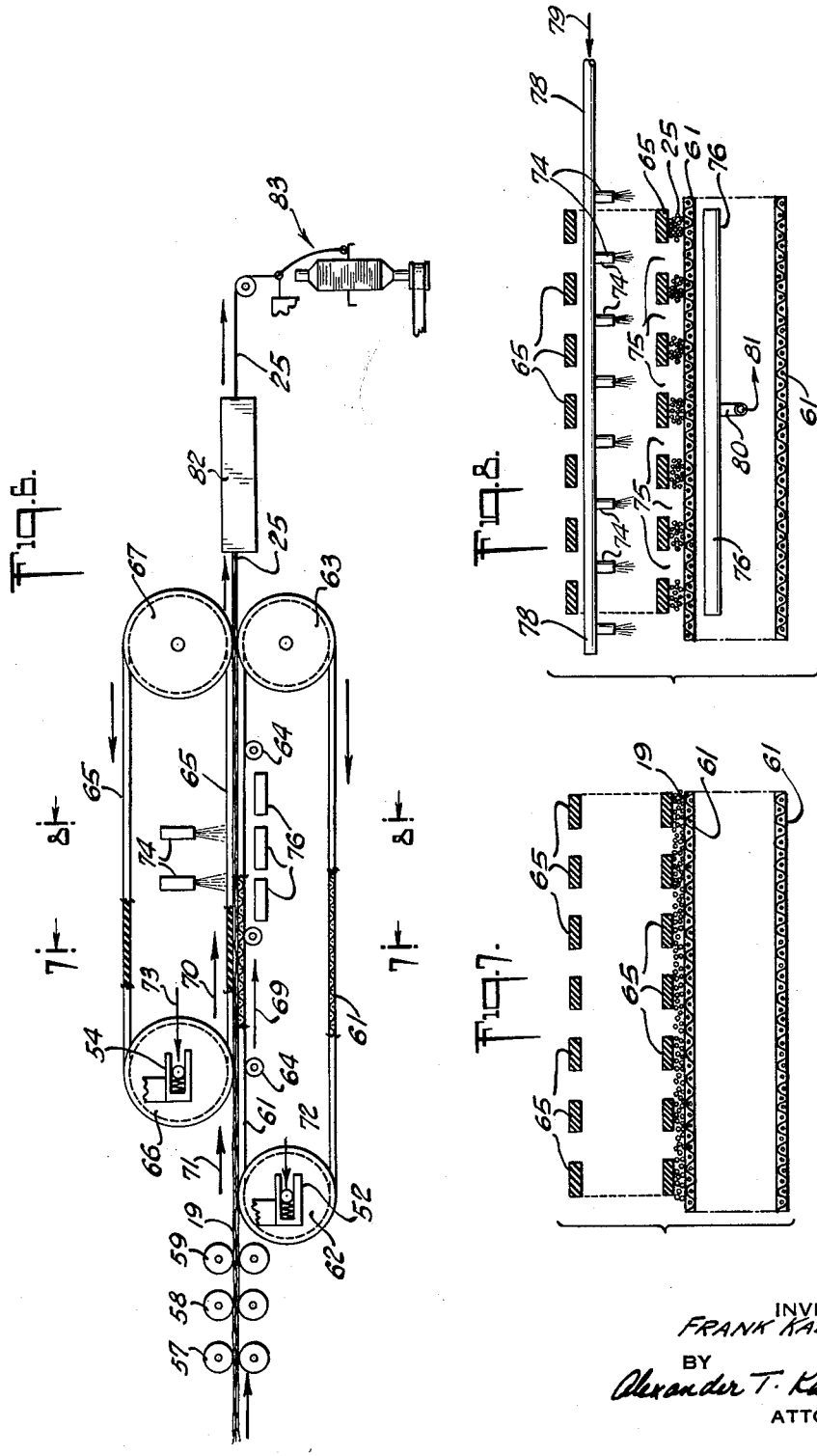

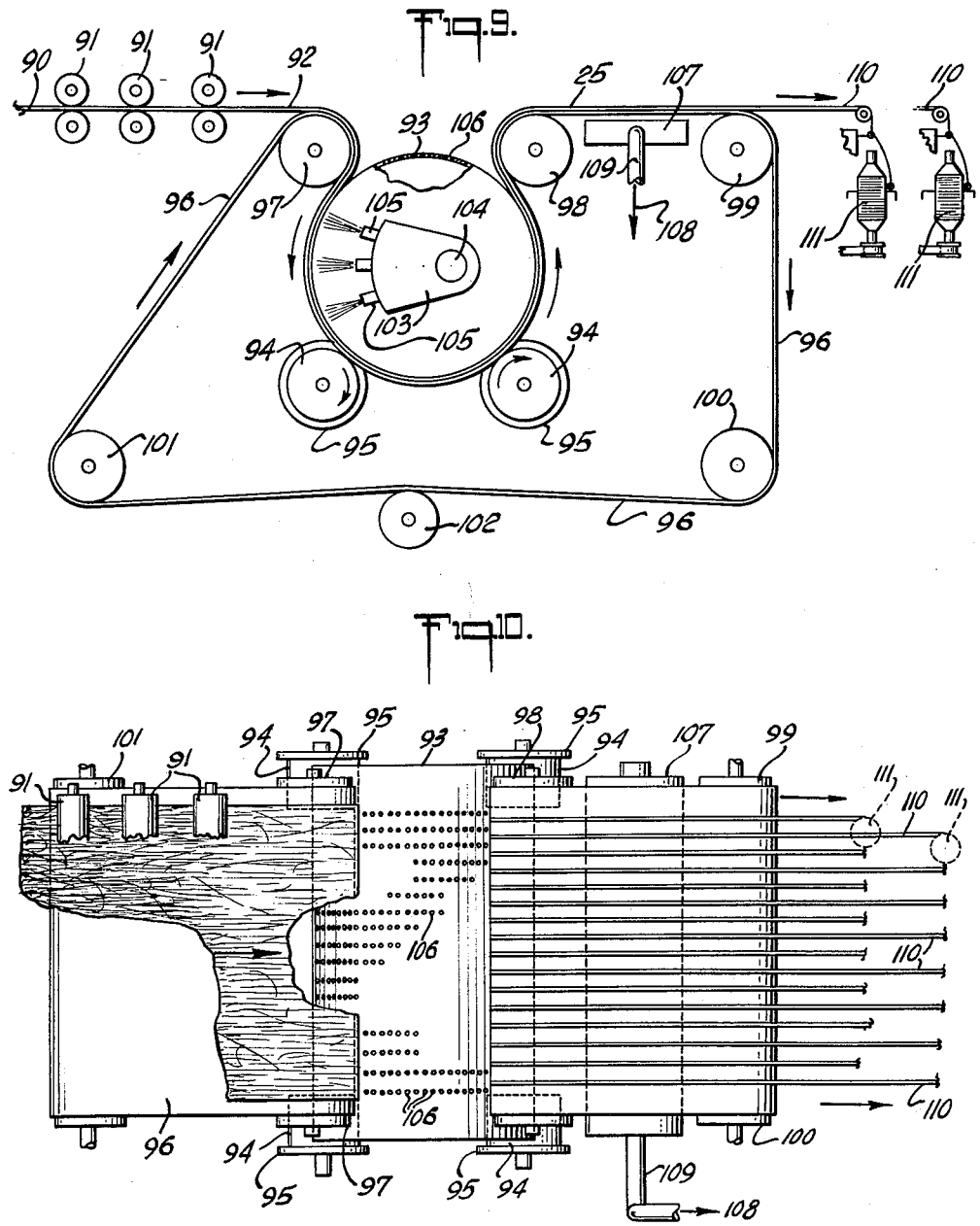

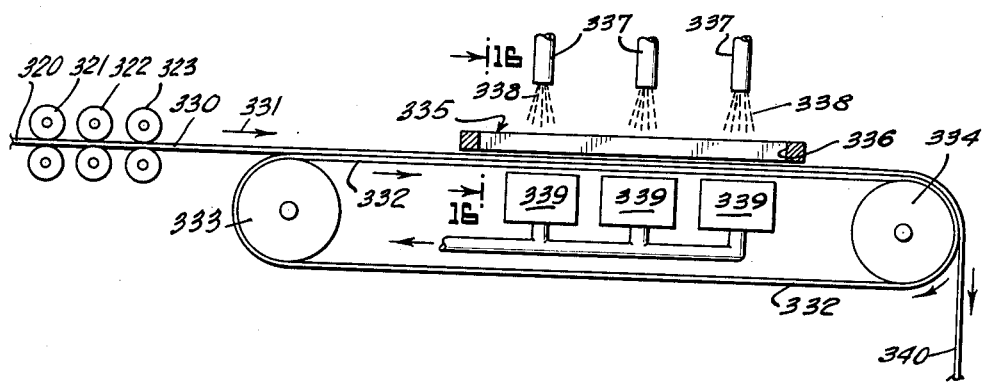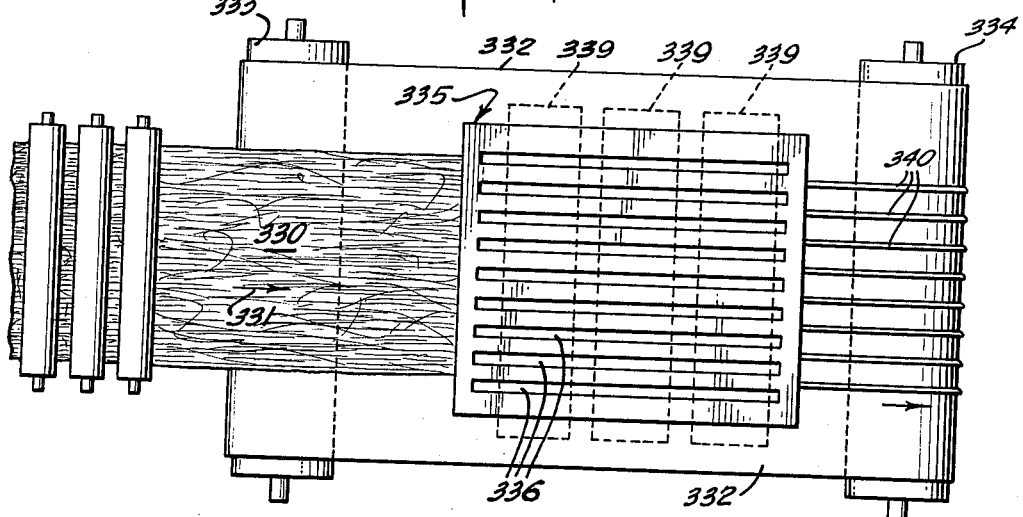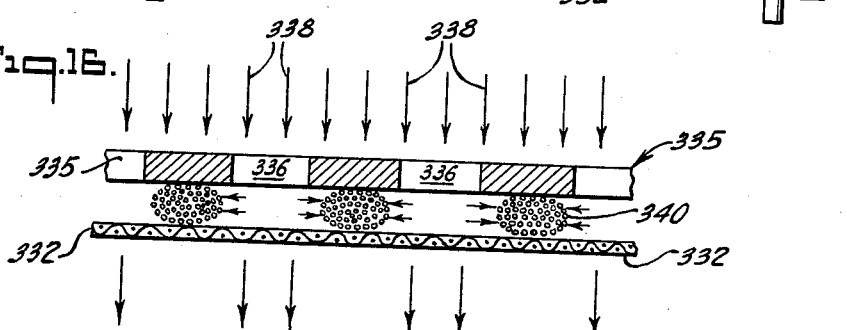

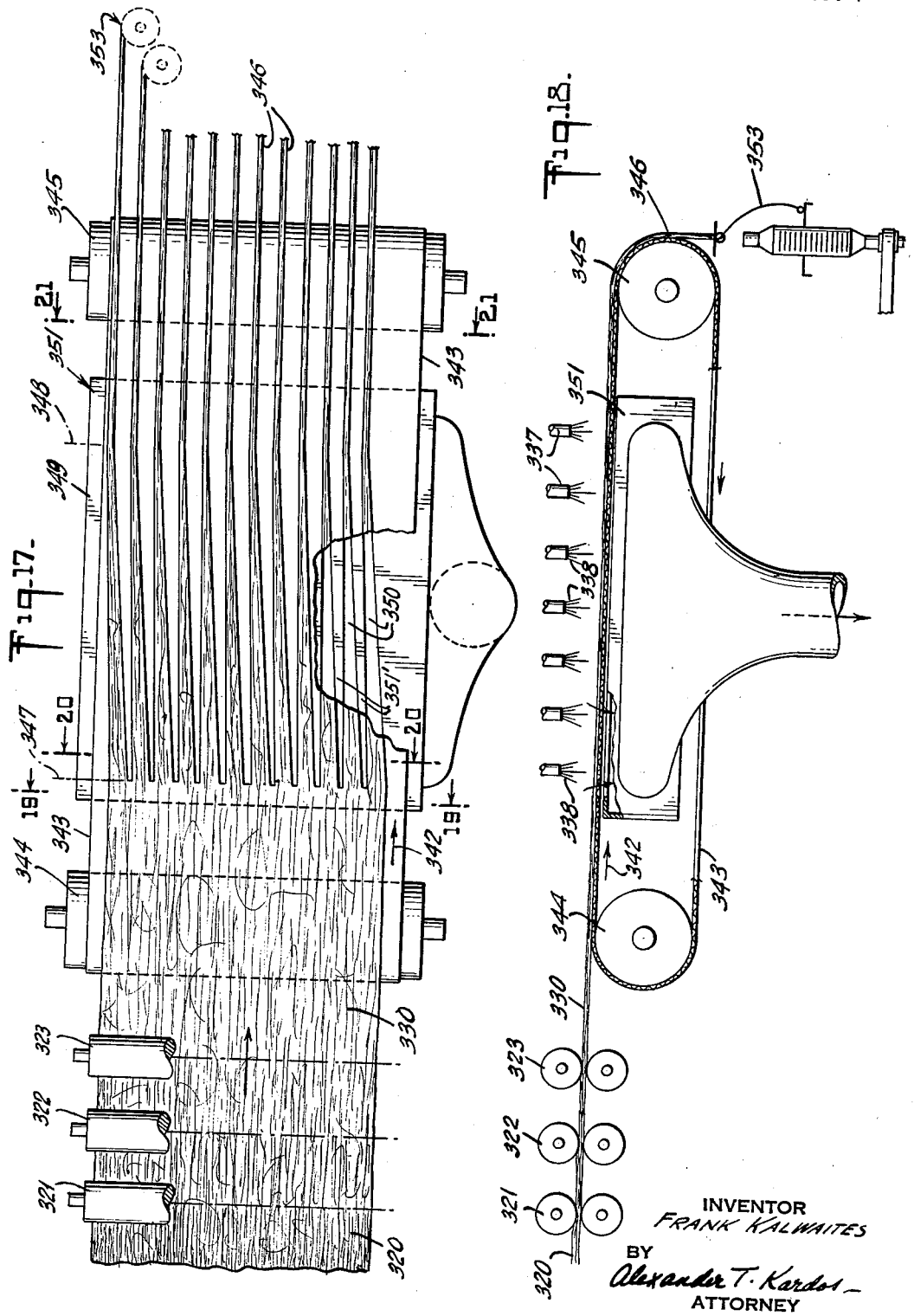

June 2, 1964 F. KALWAITES 3,135,023
METHOD AND APPARATUS FOR MAKING STRANDS, YARNS, AND THE LIKE
Filed June 27, 1958 9 Sheets-Sheet 8

INVENTOR
FRANK KALWAITES
BY
Alexander T. Kardos
ATTORNEY

June 2, 1964 F. KALWAITES 3,135,023
METHOD AND APPARATUS FOR MAKING STRANDS, YARNS, AND THE LIKE
Filed June 27, 1958 9 Sheets-Sheet 9
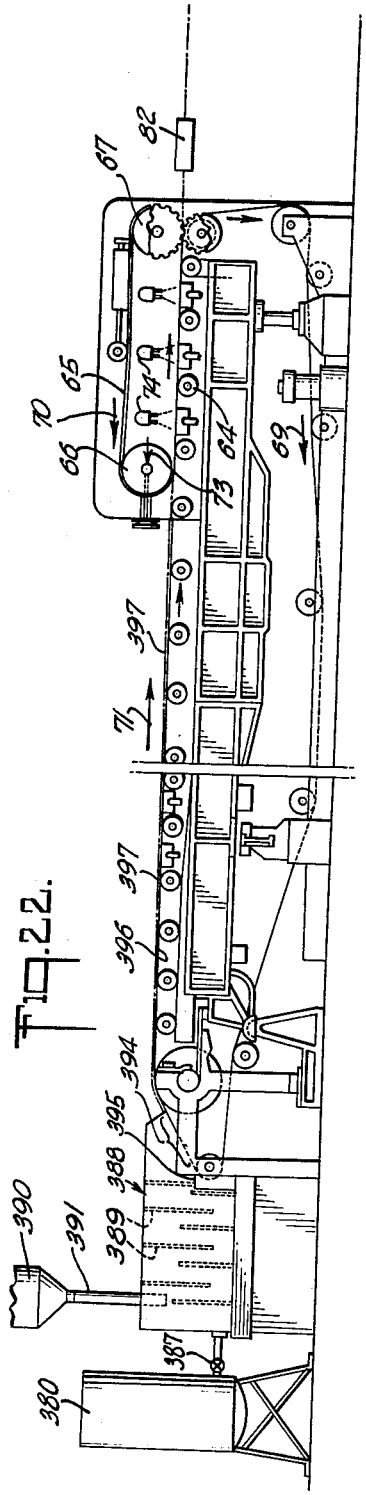
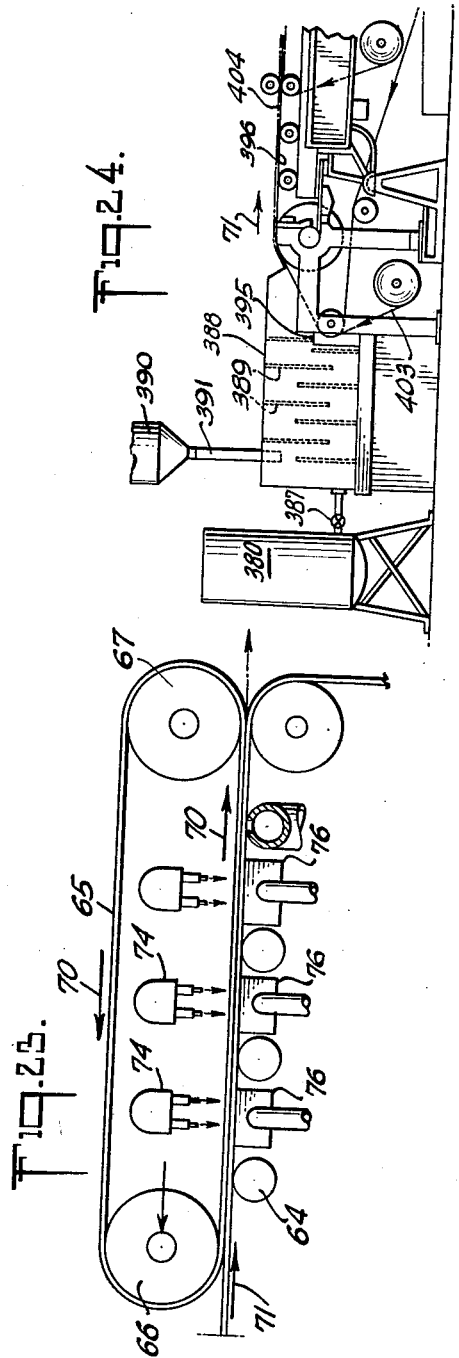
INVENTOR
FRANK KALWAITES.
BY
Alexander T. Kardos.
ATTORNEY 3,135,023
METHOD AND APPARATUS FOR MAKING STRANDS, YARNS, AND THE LIKE
Frank Kalwaites, Somerville, N.J., assignor, by mesne assignments, to Johnson & Johnson, New Brunswick, N.J., a corporation of New Jersey
Filed June 27, 1958, Ser. No. 745,010
18 Claims. (Cl. 19—150)

This invention relates to strands, yarns, and the like, and more particularly to a novel method and novel apparatus for making the same.

Use of the method and apparatus of this invention results in a strand containing fibers disposed substantially in longitudinal alignment and parallelism and bundled, packed, or consolidated along their lengths by applied rearranging forces. The strand may be twisted into rovings or yarns; it may then be bonded; or it may be untwisted and bonded, as desired or required.

INVENTION SUMMARIZED

In practicing the method of this invention, the starting material is a flat, elongated, sheet-like fibrous web or layer containing fibers capable of movement under the influence of applied rearranging forces. The fibers are preferably aligned or parallelized in the direction of the longitudinal axis of the fibrous web. An example of such a fibrous starting material is a card web in which the fiber alignment has been increased somewhat over the alignment present in the web as it comes off the card. The starting material preferably contains at least some textile length fibers and may contain shorter length fibers.

The method of this invention involves the application of fluid rearranging forces to the layer of starting material in spaced, parallel deflection zones. The elongated fibrous web or other starting layer is subdivided lengthwise by the applied rearranging forces into a plurality of elongated, strand-like strips or bands by the displacement of fibers lying in the intervening deflection zones between the strand-like strips. The fibrous material is thus rearranged, packed and consolidated, and the individual fibers are moved substantially into longitudinal alignment with the long axis of each strand-like strip by the action of the applied rearranging forces. In the preferred form of the method of the invention, the rearranging forces are fluid and most desirably hydraulic in nature.

The apparatus of the present invention implements the method of the present invention by providing the necessary structure for preparing the fibrous web for the rearranging process by properly aligning the individual fibers, then suitably supporting and positioning the fibrous web, and finally properly directing and controlling the flow of the rearranging fluid into and through the fibrous web, whereby the individual fibers of the web are displaced and formed into substantially separate strand-like strips or bands in which the individual fibers are in substantial longitudinal alignment and parallelism with the long axis of the strand.

ADVANTAGES OF THIS INVENTION

In the conventional production of presently commercial yarn, a web of carded textile fibers is drafted, made into rovings, and otherwise mechanically processed in a plurality of separate steps, and then spun into yarn having sufficient strength and integrity to be used. The resulting twisted yarn, for reasons explained below, ordinarily exhibits an undesirably irregular and variable linear density, wherein thin weak sections and thick bulky portions are commonplace.

Moreover, the yarn resulting from prior commercial techniques is a compromise of many antagonistic qualities, notably softness and strength, which are usually inversely related. In some cases, this severely limits the usefulness of the yarn product, as for example, when softness is deirable but must be sacrificed for strength, or vice versa.

As explained in greater detail below, the preferred form of the product resulting from the use of the method of the present invention has a linear density that is substantially constant and very nearly uniform along the length thereof. This uniformity of linear density may be achieved regardless of whether the individual fibers comprising the strand or yarn are of substantially uniform lengths or are of various lengths, which is not true of most strands and yarns produced by conventional methods.

Additionally, the product of this invention may be untwisted and bonded, or it may be merely twisted without necessarily being bonded, to produce the necessary strength. When twisting is employed, the results achieved are unique because a low or very limited twist is sufficient to provide strengths normally associated with far more tightly twisted conventional yarns. Consequently, only limited reduction in softness is encountered with the yarns of the present invention, whereas most conventional twisted yarns of corresponding strength would be of a higher twist and substantially harder.

The method of the present invention provides valuable economies in that the equipment required is comparatively simple and is capable of high speed operation. Accordingly, valuable strand- and yarn-like products are achieved simply and rapidly, with a minimum of handling and supervision, and, consequently, at a minimum of cost.

STARTING MATERIALS

The fibrous web or layer which is processed to form the product of this invention may contain various lengths of textile fibers, say, from about one-half inch in length up to about two and one-half inches or more in length, as well as mixtures thereof. If desired, the fibrous layer may include a minor proportion, less than 50% by weight and preferably less than about 25% by weight, of fibers other than those of textile length. These may be fibers such as papermaking length fibers, which extend down to about one-eighth of an inch in length, for example, which shorter fibers normally cannot be used in conventional methods of producing strands or yarns.

Illustrative of the shorter length fibers which may be employed are the natural cellulosic fibers such as papermaking woodpulp and wood fibers and cotton linters, mineral fibers such as asbestos, or any of the above-mentioned fibers if in lengths of less than one-half inch and down to about one-eighth inch or less.

It is preferred that the shorter papermaking fibers be unbeaten or substantially unhydrated, if a textile-like fabric is desired as the ultimate end product to be made from the yarns or strands produced by the method and apparatus of this invention. In this connection, shorter hydrated fibers of woodpulp in a papermaking length, for instance, may be mixed with longer fibers in such a way that the longer fibers will contribute the strength desired in the ultimate fabric while the shorter wood fibers will decrease its cost. Good results can also be obtained with a layer of hydrated woodpulp fibers which would introduce elements of a plastic mass into the fibrous sheet.

The fibrous starting material may also contain various types of particulate solids, including materials having potentially adhesive character or capable of providing visual or other sensory interest. If desired, the fibrous layer may also include special fibers, as for example fibers which are capable of curling, bending, stretching, shrinking or otherwise deforming after the yarn has been produced. The main requirement for these added individual elements of the starting fibrous material is that they also must be capable of movement under the influence of the applied rearranging fluid force. Thus, this invention is not limited to the use of any particular fiber but can take advantage of many properties of different fibers, as well as mixtures of fibers.

For producing a strand or yarn useful in making a fabric having the characteristic hand and drape of a textile fabric, the layer of starting material or base web may comprise natural vegetable and animal fibers such as cotton, silk, wool, flax, ramie, jute, abaca, etc.; the synthetic or man-made fibers such as the cellulosic fibers, notably cuprammonium, viscose or regenerated cellulose fibers; cellulose ester fibers such as cellulose acetate and cellulose tri-acetate; the saponified cellulose ester fibers such as "Fortisan" and "Fortisan-36"; the polyamide fibers such as nylon 6 (polycaprolactum), nylon 66 hexamethylene diamine-adipic acid), nylon 610 (hexamethylene diamine-sebacic acid), nylon 11 (11-amino undecanoic acid, "Rilsan"); protein fibers such as "Vicara"; halogenated hydrocarbon fibers such as "Teflon" (polytetrafluoroethylene); hydrocarbon fibers such as polyethylene, polypropylene and polyisobutylene; polyester fibers such as "Dacron"; vinyl fibers such as "Vinyon" and saran; dinitrile fibers such as "Darvan"; nitrile fibers such as "Zefran"; acrylic fibers such as "dynnel," "Verel," "Orlon," "Acrilan," "Creslan," etc.; mineral fibers such as glass, etc.

The denier of the individual synthetic fibers referred to above is preferably in the range of the approximate thickness of the natural fibers mentioned and consequently deniers in the range of from about 1 to about 3 are preferred. However, where greater opacity or greater covering power is desired, deniers of down to about ¾ or even about ½ may be employed. Where greater bulk and loft, however, are desired, deniers of up to about 5.5, 6, 8, 10, 15, or higher, are suitable. The minimum and maximum denier would, of course, be dictated by the desires or requirements for producing a strand or yarn to be used in making a particular fabric, and by the machines and methods for producing the same.

The weight of the fibrous web or layer of starting material may be varied within relatively wide limits depending upon the requirements of the finished product. A thin web of fibers as produced by a card may have a weight of from about 35 to about 95 grains per square yard. Such a thin fibrous web, however, is so fragile that its handling and manipulation is extremely difficult. In the usual case, therefore, from about 3 to about 12 or more of these webs are combined and processed in the combined form. In instances where products having a greater weight are desired, total web weights of as high as about 1800 or 2000 grains or more per square yard may be processed. Within the more commercial aspects of the present invention, however, web weights of from about 150 grains per square yard to about 850 grains per square yard are contemplated.

As is evident, when the fibrous starting layer is divided by the fluid rearranging forces of this invention into elongated strand-like strips or bands, the distance separating adjacent ones of the resulting strands is determined principally by the physical nature and intensity of the rearranging forces employed, the shape, size and spacing of the parallel deflection zones to which the rearranging forces are applied, the nature and arrangement of the fibers in the starting layer, the nature of the backing member on which the fibrous starting layer is supported, and the freedom of movement of the individual fibers upon the backing member.

The distance separating adjacent strands in turn affects the length of the individual fibers that may be employed in the starting material, as well as the degree of fiber alignment that should be present in the starting material in order to avoid too many interconnecting cross fibers and to achieve substantially separate strands as the final products of the method. If the individual starting fibers are no longer than the distance separating adjacent strands to be produced by the method of this invention, the degree of alignment or parallelization of the fibers in the starting material is relatively unimportant. However, when the individual fiber length is greater than the distance between adjacent strands to be produced by the method of the invention, the degree of alignment of the fibers of the starting material becomes increasingly important as the length of the fibers increase. If it is desired to achieve substantial separation of adjacent strands without having to sever any large number of interconnecting fibers, the degree of alignment or parallelization of the starting fibers must be higher the longer are the fibers.

As stated above, a conventional card web makes a very suitable starting material for the method of this invention, especially after it has been given some additional drafting upon being taken off the carding machine. In a web produced as just described it is difficult to measure fiber orientation or alignment directly because the individual fibers thereof are curled and bent, with various segments of the fibers extending in various directions. However, a kind of average orientation which is helpful in describing the physical characteristics of the web may be arbitrarily defined and experimentally measured. This characteristic is called the "degree of fiber orientation," "degree of fiber alignment," or "percent of fiber parallelism." The "degree of fiber orientation" is determined by bonding the web uniformly with a material such as starch, drying the bonded web, measuring tensile strengths lengthwise and crosswise of the resulting fabric, and then computing the percentage of lengthwise or long strength of the fabric to its total strength. Total strength, for this purpose, is the sum of the tensile strengths in the long and cross directions. Thus, if the long tensile strength in a conventional card web is three times the cross tensile strength, the "degree of fiber orientation" or "degree of fiber alignment" is 75 percent. When the quoted terms or similar terms are used in this specification and claims, they have the meaning just indicated.

One skilled in the art who applies the teaching of this specification will be able to examine a given starting fibrous layer and determine whether the method of this invention can be used to produce a satisfactory group of strand-like products connected by a minimum, if any, cross fibers. In making this determination, measurement of the "degree of fiber orientation" or "degree of fiber alignment" as defined above will be helpful. If the distance by which the final strands are to be separated is, for example, about ⅛ inch, it has been found that rayon fibers of fairly high textile length (say, about 1¼ inches or over), to be rearranged by streams of water applied against the fibers while supported in a narrow space between a foraminous nylon belt and parallel solid belts defining elongated open zones, should display about 90% alignment in the longitudinal direction of the starting web in order to form substantially separate strands of fibers. Preferably such starting fibers should have about 95% alignment, and most desirably they should be substantially 100% aligned in the longitudinal direction of the starting web. With fibers of medium textile length (say, about ¾ inch to about 1¼ inches) under the conditions specified, a fibrous starting material having about 80% or more alignment will produce satisfactory results. If fibers of short textile length (about ½ inch to about ¾ inch) are employed under the same conditions, a starting material of as low as 70% alignment may be used.

When the fibrous starting material includes a mixture of fibers of various fiber lengths, the fibers of any particular length should be oriented approximately to the degree indicated above for that particular length, and the fibers of any other given length should be oriented approximately to the degree indicated for that length.

Unless otherwise indicated, the distance separating the final strand-like products resulting from the use of the method of this invention is about ⅛ inch for the various statements made in this specification, whether in the specific examples or elsewhere.

UNIFORMITY OF LINEAR DENSITY IN PRODUCTS RESULTING FROM METHOD OF THIS INVENTION

The yarn or strand produced by use of the method of this invention exhibits strikingly uniform linear density. This uniformity of linear density is achieved by producing the strand or yarn product from a starting material, such as a card web, that itself possesses a relatively high degree of fiber alignment as well as uniformity in web weight throughout its area.

In contrast to the uniformity of linear density of the strands and yarns of the present invention, conventional staple yarns made by currently popular processes generally exhibit a widely fluctuating linear density. The weight per unit length of a conventional staple yarn may vary from a value as high as several times the average linear density of the yarn to a value as low as a small fraction of the average linear density. The reason for this fluctuation in linear density is that conventional yarn is produced by a process employing several roller drafting steps which unavoidably introduce variations, and these variations are unavoidably exaggerated further in subsequent steps of the process.

The disadvantages produced by these linear irregularities in conventional staple yarns are that marked variations in density increase the tendency of the yarn toward pilling and fraying which enables the loose fibers to ball up in washing or during use. This produces a less attractive appearance, particularly in woven and knitted fabrics where uniformity of appearance is desired.

To illustrate the lack of uniformity of conventionally prepared yarn, about 100 cm. of a typical commercial 30s warp yarn was severed into 1 cm. lengths and each length weighed. The average linear density or weight per centimeter of the yarn was about 0.25 mg./cm. However, the individual severed lengths had widely different weights, some of which were as high as 0.68 mg./cm., and others of which were as low as 0.08 mg./cm. This represented a maximum variation of about +172% and −68% with respect to the average linear density. A majority of the linear densities were either greater than 0.33 mg./cm. or less than 0.17 mg./cm., or in other words more than 33⅓% removed from the average linear density of the yarn. Some of the differences in weight between immediately adjacent 1 cm. lengths were in excess of 0.25 mg./cm., which calculates to be a variation of 100% based on the average weight.

To contrast these characteristics of conventionally prepared yarn with the yarn product resulting from use of the method of the present invention, a length of the latter was made by the method of this invention from the same card web used to make the above-mentioned 30s warp yarn. A portion of this yarn product 100 cm. in length had an average linear weight of about 0.25 mg./cm. This 100 cm. portion was severed into 1 cm. lengths and weighed. The uniformity of linear density along the length of the yarn was remarkable, the variation over the 100 cm. length of the yarn being less than about 0.01 mg./cm. with respect to the average linear density. This is a variation of less than about ±4% per centimeter. The evaluation of linear density of yarns of the present invention was repeated with variations being obtained of less than about 0.02 mg./cm. with respect to the average linear density. This is a variation of less than about ±8%. The yarn product of this invention is thus seen to be substantially uniform in linear density. This remarkable uniformity in weight along the length of the yarn is one of the most important characteristics of the yarn of the present invention.

In yarn produced by the method of this invention, the uniformity achieved results from the substantially direct production of the yarn from the card web. As explained above, substantial uniformity of weight of the starting carded web can be readily attained in practice. Elimination of the plurality of drafting operations eliminates the principal source of non-uniformity along the length of the yarn. The web of extremely uniform weight coming from the card, or after undergoing some degree of increased alignment, particularly where the fibers are of long textile length, say, greater than 1¼ inch, is immediately fed to the hydraulic rearranging apparatus. In essence, this rearranging apparatus separates or slits the web into uniform increments of width depending upon the weight of yarn to be made. Since there is less or no drafting at all in the process of the invention, the uniformity present in the carded web is preserved in the resulting strand and yarn product.

REARRANGING FLUID

The treating fluid which is used to rearrange the fibers in the web in the method of this invention is preferably water, but it may also contain materials which it is desired to incorporate in the strand- or yarn-like product. For example, the treating liquid may be an aqueous liquor containing a binder, a dye, a flame-retardant agent, a moth- or mildew-proofing material, a wet-strength agent, an insecticide or germicide, a disinfectant, etc.

If desired, and particularly where the fiber selected is hydrophobic, the water used in the hydraulic rearrangement may be heated to facilitate fiber relaxation and rearrangement. Liquids other than water may also be used, either alone or with the water, to facilitate fiber relaxation or simply to modify the wetting action of the water upon the fibers for the purpose of increasing lubricity to thereby facilitate rearrangement by fluid forces.

The invention will be more fully understood from the description which follows, taken in conjunction with the accompanying illustrative drawings, in which:

FIGURE 1 is a simplified idealized fragmentary perspective view of a portion of a continuous strand of fibers made in accordance with the present invention, a portion of the strand being broken away to reveal the interior thereof;

FIGURE 2 is a simplified schematic view in elevation showing the general principles of operation of the present invention, prior to the rearrangement of the fibers of the web into continuous strands;

FIGURE 2a is a simplified schematic view in elevation, similar to FIGURE 2, showing the general principles of operation of the present invention, subsequent to the rearrangement of the fibers of the web into continuous strands;

FIGURE 3 is a simplified schematic view in elevation, partially in cross-section, of a preferred physical embodiment of the present invention;

FIGURE 4 is a schematic fragmentary perspective view of an alternate preferred physical embodiment of the present invention with portions omitted for the purposes of clarity;

FIGURE 4a is a schematic fragmentary plan view of the alternate preferred embodiment of the present invention illustrated in FIGURE 4 with the rearranging plate removed to reveal the continuous strand formation more clearly;

FIGURE 5 is a simplified schematic view in cross-section of another modification of the present invention, prior to the rearrangement of the fibers of the web into continuous strands;

FIGURE 5a is a simplified schematic view in cross-section of the modification of FIGURE 5, subsequent to the rearrangement of fibers of the web into continuous strands;

FIGURE 6 is a simplified diagrammatic elevational view, partially in cross-section, showing still other apparatus for carrying out other forms of the methods of the present invention, generally similar in broad principle to the apparatus illustrated in FIGURES 2 through 5;

FIGURE 7 is a diagrammatic cross-sectional view of the apparatus shown in FIGURE 6, taken on the line 7—7 in the direction indicated, with portions of the apparatus omitted for purposes of clarity, showing the fibrous web construction prior to the rearrangement of the fibers into continuous strands;

FIGURE 8 is a diagrammatic cross-sectional view of the apparatus shown in FIGURE 6, taken on the line 8—8 in the direction indicated, with portions of the apparatus omitted for purposes of clarity, showing the continuous strand construction subsequent to the rearrangement of the fibers;

FIGURE 9 is a simplified diagrammatic elevational view, partially in cross-section, showing apparatus including a rearranging drum and a foraminous support for rearranging the fibers of the web into continuous strands;

FIGURE 10 is a simplified diagrammatic plan view, partially cut away, of the apparatus shown in FIGURE 9 including a rearranging drum and a foraminous support for rearranging the fibers of the web into continuous strands;

FIGURE 11 is a simplified diagrammatic elevational view, partially in cross-section, showing apparatus including rearranging V-belts and a foraminous support for rearranging the fibers of the web into continuous strands;

FIGURE 12 is a simplified schematic elevational cross-section taken on the line 12—12 of FIGURE 11 in the direction indicated, showing the fibrous web construction prior to rearrangement of the fibers into continuous strands;

FIGURE 13 is a simplified schematic elevational cross-section taken on the line 13—13 of FIGURE 11 in the direction indicated, with portions of the apparatus omitted for purposes of clarity, showing the continuous strand construction subsequent to rearrangement of the fibers;

FIGURE 14 is a simplified schematic diagrammatic elevational view, partially in cross-section, with portions of the apparatus omitted for purposes of clarity, showing apparatus including a stationary slotted rearranging plate and a foraminous support for rearranging the fibers into continuous strands;

FIGURE 15 is a simplified schematic plan view of the apparatus shown in FIGURE 14 illustrating apparatus including a stationary slotted rearranging plate and a foraminous support for rearranging the fibers of the web into continuous strands;

FIGURE 16 is a simplified schematic elevational view in cross-section, showing the principles of operation of the apparatus illustrated in FIGURES 14 and 15;

FIGURE 17 is a simplified schematic plan view, partially broken away to illustrate basic principles more clearly, showing other apparatus including a rearranging plate and a foraminous support for rearranging the fibers of the web and producing more compacted strands;

FIGURE 18 is a simplified schematic elevational view, partially in cross-section, of the apparatus illustrated in FIGURE 17;

FIGURE 22 is a simplified schematic elevational view showing still another method and apparatus involving papermaking techniques for producing the strands of the present invention;

FIGURE 23 is a simplified fragmentary diagrammatic elevational view, partially in cross-section, showing in greater detail that portion of the apparatus of FIGURE 22 providing for the rearrangement of the fibers; and FIGURE 24 is a simplified fragmentary schematic elevational view showing a modification of the apparatus illustrated in FIGURE 22.

THE PRODUCT RESULTING FROM THE METHOD OF THIS INVENTION

Figure 19:
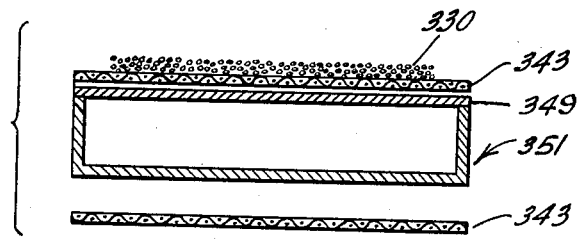
FIGURE 19 is a simplified diagrammatic cross-sectional view of the apparatus shown in FIGURE 17, taken on the line 19—19 in the direction indicated, with portions of the apparatus omitted for purposes of clarity, showing the fibrous web construction prior to the rearrangement of the fibers into continuous strands.

FIGURE 1 represents a simplified, fragmentary, perspective view of a continuous strand of fibers made in accordance with the present invention. As can be seen, substantially all of the individual fibers 10 of the strand are arranged in substantially longitudinal alignment and are consolidated in closely packed, relatively untwisted relationship. The individual fibers 10 have their longitudinal axes generally parallel to the longitudinal axis of the strand and are generally parallel to one another.

A few meandering fibers 11 spirally encircle some of the longitudinally aligned fibers 10, the over-all direction of orientation of the meandering fibers 11 being somewhat generally the same as that of the longitudinally aligned fibers 10. A few free ends or tips 12 of some of the surface fibers of the fibrous strand protrude therefrom to form a fuzz or nap on the surface thereof which provides a desirable softness and hand thereto. The fuzz constituted by the fibrous ends 12 is believed to be caused by the curling of the free ends of the unconfined surface fibers during heating, drying or other processing.

SCHEMATIC ILLUSTRATION OF THE METHOD OF THIS INVENTION

The method of this invention is schematically depicted in FIGURES 2 and 2a, wherein the reference numeral 19 designates a fibrous layer such as a highly aligned card web which is carried on a foraminous supporting member 20, such as a wire or plastic screen or other open mesh material. In FIGURE 2, the highly aligned card web 19 is shown intact in one piece on the foraminous support 20. This is the existing situation at the beginning of the rearranging process before a fluid is passed into and through the web 19 to rearrange its fibrous structure.

As can be seen in FIGURE 2a, a fluid, which is preferably a liquid, as, for example, water or other aqueous medium, is passed in spaced, generally parallel zones 23 through the fibrous material 19 being treated, and then through the foraminous support 20. The flow of liquid toward the fibrous material 19 on the foraminous support 20 is indicated diagrammatically by the directional arrows 21 in FIGURES 2 and 2a, and the flow of liquid which has passed through the support 20 is identified by the directional arrows 22 in FIGURE 2a.

Some of the liquid striking the upper surface of the support 20 in the spaced-apart zones 23 is displaced or deflected laterally thereon in directions generally parallel to the median plane of the fibrous card web 19 on support 20. All of the liquid striking the foraminous support 20 and so deflected laterally thereon will have components of motion and force parallel to that median plane. The displaced flow of liquid is indicated in FIGURE 2a by the directional arrows 24.

As can be seen from FIGURES 2 and 2a, the web 19 is separated and divided by the liquid into fiber bundles 25 which are peripherally packed by the deflected flowing liquid forces 24 on the support 20. The fibers constituting each bundle 25 are packed and deposited so that the longitudinal axis of each bundle 25 lies approximately midway between the spaced zones 23. The fluid forces 24 acting generally parallel to the median plane of the fibrous layer 19 and applied on opposite sides of each fibrous bundle 25 are generally opposite in direction and are in substantial equilibrium. Thus, the fibers 10 and 11 in the fibrous wet material being treated are rearranged, longitudinally aligned, and formed into a packed bundle 25 under conditions of substantial equilibrium.

It will thus be realized from FIGURES 2 and 2a that movement of the card web 19 through the plane of these figures will cause successive portions thereof to be acted upon by the liquid forces 24 to cause it to be separated into a plurality of spaced, parallel, continuous strands of substantially aligned fibers formed of successions of fibrous bundles 25.

STARTING MATERIAL BETWEEN SLOTTED DIVIDER MEANS AND FORAMINOUS SUPPORT

FIGURE 3 is a diagrammatic sectional view of a preferred physical embodiment of the present invention in which the rearranging fluid 21 is applied to the card web 19 in a pattern wherein the spaced apart zones 23 are physically defined and separated by slotted divider means 30 which extend in a direction generally parallel to the direction of predominant orientation of the fibers in the drafted card web 19. The reference numerals 19 through 25 have the same significance in FIGURE 3 that they had in FIGURES 2 and 2a.

As will be explained below in connection with other preferred embodiments of this invention, the foraminous supporting member 20 and the fibrous web 19 being rearranged into continuous bundles or strands 25 may move together through the region in which the fluid forces 24 are applied. The slotted means 30 may either move with the fibrous material 19 and the support 20 therefor through the rearranging region, or it may remain stationary with respect thereto, as desired.

STARTING MATERIAL BETWEEN REARRANGING PLATE HAVING ELONGATED PERMEABLE ZONES AND FORAMINOUS SUPPORT

FIGURE 4 is a schematic fragmentary perspective view of an alternate preferred embodiment of the present invention which is basically similar in operating principle to the embodiment depicted in FIGURE 3. The card web 19 which is being treated contains fibers which are aligned to say, at least to about 90% parallelism, and preferably greater than 95%, and most desirably close to 100% parallelism. These percentages are particularly applicable where the fibers in the web are of the longer textile length type, say, greater than 1¼ inches. For webs containing medium length textile fibers (1¼ inches to about ¾ inch) and the shorter textile length fibers (about ¾ inch to about ½ inch), lower percentages down to 80% or even 70% may be tolerated. For shorter fibers, less than ½ inch, the percentages may be lower.

An elongated rearranging plate 42 having aligned rows of closely spaced apertures 41 therein which extend in a direction parallel to the direction of fiber alignment is used to replace the slotted divider means 30 of FIGURE 3. Each row of closely spaced apertures 41, in effect, forms an elongated permeable zone through which the applied liquid 21 can pass. The foraminous supporting member 20 underlies the fibrous layer 19 in the apparatus of FIGURE 4, and carries it through the rearranging region wherein it is separated into a plurality of individual strands of substantially parallelized fibers.

Liquid 21 is directed in equally spaced substantially parallel streams at the plate 42 containing the closely spaced apertures 41 and penetrates therethrough in zones to contact and to rearrange the fibers in the highly aligned card web 19 in the general manner described with reference to FIGURES 2 through 3. The rearranging liquid 21 is displaced or deflected laterally on the foraminous supporting screen 20 in FIGURE 4, as in the manner described with reference to FIGURE 3, except that the displacement is a radial one, as shown in FIGURE 4a, with the forces 24 exerted by the liquid 21 emanating in spoke-like fashion, directed outwardly from the apertures 41. When the fibers of the card web 19 possess a high initial alignment, say greater than 90% parallelism, for example, the individual continuous strands of fibers 25 formed therefrom contain only a very few crossing fibers 43 and these usually rupture when the strands 25 are separated after formation.

In the event that the initial alignment of the fibers in the card web 19 is not above 90% and is about 80%, or even less, the number of crossing fibers 43 (particularly when long textile length fibers are used) linking the individual strands 25 together increases to a point wherein cutting or severing devices may be efficiently employed to cut the crossing fibers 43 and to more readily separate the linked strands 25 following their formation.

The direction of travel of the fibrous layer 19 and the foraminous support 20, when they move together through the rearranging region in which fluid forces 24 are applied, as indicated by directional arrow 44. The plate 42 containing the rows of closely spaced perforations 41 may move through the rearranging region with the same linear speed as the fibrous layer 19 and the foraminous support 20. However, plate 42 may be moved with a differing linear speed, or even be stationary with respect thereto.

STARTING MATERIAL SUPPORTED UPON SPACED WEDGE-SHAPED DIVIDERS AND FORAMINOUS BACKING MEMBER

A furether preferred embodiment of the invention is diagrammatically shown in schematic cross-section in FIGURES 5 and 5a wherein the reference numerals 19 through 25 have their previously indicated significance.

As shown in FIGURE 5, a fibrous layer such as a highly aligned card web 19 which is to be rearranged is initially superposed upon spaced triangular wedge members 50 which are supported on the foraminous carrier 20. As shown in FIGURE 5a, liquid streams 21 directed substantially uniformly thereat force the fibrous material 19 to be separated into packed narrow bands or bundles 25, assisted by means of the triangular wedge members 50. The individual fibers are forced into the valleys or zones between the wedge members 50, where the laterally displaced fluid forces 24 acting substantially parallel to the median plane of the fibrous layer 19 and applied from opposite sides of each band are in substantial equilibrium. The formation of the compacted fiber bundles or strands of fibers 25 results from such fluid forces.

As shown in FIGURES 5 and 5a, the triangular wedge members 50 are separate elements and may rest upon and be carried on the foraminous support 20. In such case, the wedge members must not be spaced from the foraminous support so as to permit any fluid stream to carry fibers under the wedge members.

It is not essential, however, that the wedge members 50 and the foraminous carrier 20 be separate elements. In some uses, it has been found advantageous to make the wedge members 50 and the foraminous support 20 into an integral structure whereby they travel together as a single unit.

It will be observed that in each embodiment that has been described hereinbefore, the fibrous layer or aligned card web 19 which is to be rearranged is supported on the foraminous support 20; that fluid (preferably a liquid such as water) is passed through the fibrous layer 19 and then through the foraminous support 20 (arrows 21 and 22); that spaced, parallel elongated zones in which liquid is laterally displaced are employed to separate the fibrous layer 19 into strips or bands 25; that the fibers are hydraulically rearranged and deposited, with the fluid forces parallel to the median section of the fibrous layer and applied on generally opposite sides of each fibrous band being in substantial equilibrium; and that the fiber bundles 25 are formed about a longitudinal axis substantially midway between the spaced zones of application of the rearranging fluid.

As used in this specification and in the claims, the term "median section" of the fibrous layer means the locus of all points midway between the two general boundary surfaces of the layer. The median section of the fibrous layer will often be a plane, and will lie substantially parallel to the plane of the foraminous supporting means.

STARTING MATERIAL BETWEEN A PLURALITY OF INDIVIDUAL, SPACED REARRANGING BELTS AND A FORAMINOUS SUPPORT

FIGURES 6, 7 and 8 diagrammatically illustrate apparatus for carrying out another form of the method of this invention, generally similar in broad principle to that illustrated in FIGURES 2 through 5.

In FIGURE 6, a fibrous layer 19 is passed through drafting means 57, 58 and 59 having a total draft of about 2 which progressively increases the degree of fiber alignment in the web. In the event that the fiber alignment in the card web is sufficiently high, which may be possible particularly for the shorter of the textile length fibers, the drafting means may be omitted. However, it has been found more practical usually to include one such drafting means between the card and the hydraulic rearranging apparatus as is shown here. The draft is usually at least about 1½ or 2 and such has been found sufficient in practically all cases.

The drafting rolls deliver the aligned web to an endless foraminous support 61 such as a plastic or wire screen. The endless foraminous support screen 61 is trained around rotatable rolls 62 and 63 which are capable of continuously moving the support screen 61, as indicated. The upper reach of the support screen 61 is further positioned by intermediate idler supporting rolls 64 so as to be maintained in a substantially horizontal plane.

Several narrow, spaced, parallel, endless rearranging belts 65 located generally above the support screen 61 are trained around rotatable rolls 66 and 67 which rolls are so positioned that the lower reach of the rearranging belts 65 is sufficiently spaced from the foraminous supporting screen 61 as to permit the entry of the highly aligned card web 19 therebetween. The rearranging belts 65 fit into and are guided by spaced circumferential grooves cut into the peripheries of the supporting rolls 66 and 67. This will prevent lateral shifting of the individual rearranging belts 65 on the rollers 66 and 67 and will provide for their more precise spacing.

The direction of movement of the foraminous supporting screen 61 is indicated by the directional arrow 69; the direction of movement of the plurality of narrow rearranging belts 65 is indicated by the directional arrow 70; and the direction of movement of the card web 19 is indicated by the directional arrow 71.

Arrows 72 and 73 indicate the application of forces to the shafts or other elements of rolls 62 and 66 respectively, so that the position of the shafts of these rollers can be adjusted within brackets 52 and 54, respectively, whereby the tension on the rearranging belts 65 and the foraminous support screen 61 may be adjusted and controlled. Rolls 62, 63, 66 and 67 are so positioned that driving rotation of rolls 63 and 67 by suitable driving means (not shown) will transport the fibrous layer 19 between the plurality of rearranging belts 65 and the foraminous support screen 61 in the form of a sandwich which moves as a unitary member from the left hand rolls 62 and 66 toward the right hand rolls 63 and 67, as viewed in FIGURE 6. FIGURE 7 diagrammatically shows the sandwich in cross-section when it is first formed by the introduction of fibrous layer 19 between the spaced rearranging belts 65 and the foraminous support screen 61 before any rearrangement of the individual fibers in the layer 19 has occurred.

As the sandwich continues to advance from left to right in FIGURE 6 between the plurality of rearranging belts 65 and the foraminous support screen 61, the fibrous highly aligned card web 19 is brought beneath rows of spray heads or nozzles 74 (see FIGURES 6 and 8) which project streams of a liquid, such as water, toward the sandwich. This liquid passes, in sequence, through the elongated slot-like spaces 75 between the rearranging belts 65 (seen in FIGURE 8), then into and through the fibrous layer 19 (dividing it, as shown) and finally through the foraminous support screen 61. The resulting fiber rearrangement is clearly shown in FIGURE 8. The precise flow of the liquid through the support screen 61 and the direction of the displaced or deflected liquid streams and the forces they exert on the fibrous layer 19 are not illustrated in FIGURE 8 but reference may be made to FIGURE 3 for a clearer showing of the principles involved and the directions of the forces exerted.

FIGURES 6 and 8 show vacuum or suction means, such as vacuum boxes 76, which preferably closely underlie the upper reach of the foraminous support screen 61 and are so positioned as to be beneath that portion of the foraminous support screen 61 exposed to the liquid emanating from spray heads or nozzles 74. The use of vacuum or suction means 76 improves the bundling and rearranging of the card web 19 into the continuous strands of fiber 25 and provides for a greater degree of compacting of the fibers in the continuous strands 25. Additionally, the use of vacuum aids in the passage of liquid through the sandwich and in the dewatering of the continuous strands of fibers 25 which are formed. In FIGURE 8, the nozzles or spray heads 74 are supplied with liquid through a main conduit 78, the direction of liquid flow being indicated by directional arrow 79. Also, main vacuum line 80 communicates with the individual vacuum boxes 76, the flow of liquid and air from the boxes 76 being shown by directional arrow 81.

The separate strand-like products 25 produced as just described, are dried, as indicated in FIGURE 6, preferably by passing the same through a heated drying oven 82 and then led to twisting and winding devices 83 of the conventional type. Additional vacuum dewatering means may be used, if desired, to decrease the proportion of water in the strands 25 prior to discharge from between rearranging belts 65 and the foraminous support screen 61.

STARTING MATERIAL BETWEEN A REARRANGING DRUM AND A FORAMINOUS SUPPORT

In FIGURE 9, a fibrous card web 90 is conveyed from a conventional card (not shown) to superposed pairs of conventional drafting rolls 91 having a total draft of about 1¾ wherein the card web 90 is progressively drawn into a more highly aligned card web 92 in which the individual fibers are aligned, say, greater than 90%, and preferably over 95% and desirably close to 100% fiber parallelism. The card web 92 of highly aligned fibers passes through the nip of the last pair of drafting rolls 91 and is placed on the top of a movable, endless, foraminous plastic or wire screen or support belt 96. The foraminous supporting screen 96 then proceeds to carry the card web 92 over the rotatable guide roller 97 and into contact with a rotatable, perforated rearranging drum 93. The rearranging drum 93 is generally similar in operation and principle to the rotatable, perforated, rearranging drum disclosed in pending patent application, Serial No. 567,275, filed February 23, 1956, now U.S. Patent No. 2,862,251. As will be pointed out hereinafter, there is, however, a basic difference in the rearranging drum disclosed in said patent application and the rearranging drum of the present invention.

As seen in FIGURE 9, a three-element sandwich is formed in which the card web 92 is centrally positioned between the rearranging drum 93 and the foraminous supporting screen 96, which sandwich moves around the periphery of the rearranging drum 93.

The rearranging drum 93 may be positively driven in any desired fashion such as, for example, by a pair of synchronously driven guide wheels 94, 94 positioned in peripheral frictional driving contact therewith. Flanges 95, 95 may be provided on the driving guide wheels 94, 94 to properly position the rotatable drum 93 and to prevent lateral movement thereof. On the other hand, if desired, the foraminous supporting screen 96, rather than the drum 93, may be positively driven by frictional contact with any one of its supporting guide rollers, in which case it would drive the rotatable drum 93 by peripheral frictional driving contact therewith.

The sandwich comprising the rotatable drum 93, the card web 92 and the foraminous supporting screen 96 is thus advanced and moves about a portion of the circle defining the periphery of the rearranging drum 93, eventually into a rearranging region which is on the left hand side of drum 93, as viewed in FIGURE 9 and is spaced peripherally from the point of formation of the sandwich.

As can be seen in FIGURE 10, the periphery of the rearranging drum 93 is perforated with aligned rows of closely spaced apertures 106 which extend parallel to the direction of movement of the rearranging drum 93. Each row of closely spaced apertures forms an elongated permeable zone very similar in appearance and in general operation to the rows of closely spaced apertures 41 in FIGURE 4. The purpose and function of the rows of apertures 106 and 41 is somewhat similar, as will become apparent from the following paragraphs dealing with the rearrangement of the fibers of the card web 92 on the rearranging drum 93.

There is a critical difference, however, in the spacing of the apertures 106 of the rearranging drum 93 of the present invention, as contrasted to the spacing of the apertures in the rearranging drum of the patent application previously referred to. In the present invention, the rows of apertures 106 are very closely spaced so that there is very little land area between adjacent apertures 106, as measured in a longitudinal direction around the periphery of the rearranging drum 93. The principle of the operation of these apertures 106 is basically similar to the operation of the apertures 41 previously described with reference to FIGURES 4 and 4a. The necessity for the close spacing of the apertures 106 is apparent from a consideration of FIGURES 4 and 10 inasmuch as close spacing with very small land areas prevents the formation of the connecting fibers between the individual strands.

Within the rearranging drum 93 is positioned a stationary header 103 which extends axially the full length of the rearranging drum. To this header 103 liquid, such as water, is supplied under pressure by means of a conduit 104. Spray jets or nozzles 105 are positioned on the front end of the header 103 and the pressurized liquid within the header 103 sprays outwardly through these nozzles and is projected forcibly against the internal surface of the rotatable drum 93, through the apertures 106 therein, then into and through the card web 92 to be deflected laterally by the supporting screen 96 before ultimately passing therethrough. When the rearranging liquid is deflected laterally by the foraminous supporting screen 96, the fibers in the card web 92 are rearranged by the fluid forces to produce a plurality of continuous strands of fibers 25 substantially in the manner illustrated in FIGURES 4 and 4a.

The foraminous supporting screen 96 then carries the continuous strands 25 beyond the rearranging region, around the rearranging drum, past rotatable support roll 98, and over suction box 107 which is connected to vacuum conduit 109, the flow of liquid and air being indicated by the directional arrow 108. The dewatered strand 110 can then be dried, twisted and wound upon bobbins 111.

The foraminous support screen 96 diverges from the strands 110, passes over guide rollers 99 and 100, is suitably tensioned by adjustable tensioning roller 102 and is guided around guide roller 101 back to guide roller 97 to complete the entire circuit.

STARTING MATERIAL SUPPORTED UPON REARRANGING V-BELTS AND A FORAMINOUS BACKING MEMBER

As shown in FIGURES 11, 12 and 13, a card web 112 is processed through conventional drafting apparatus 91 into an aligned card web and is positioned upon a plurality of endless, parallel, spaced rearranging V-belts 113. The direction of predominant fiber orientation is, of course, generally along the longitudinal axis of the highly aligned card web 112 and substantially parallel to the long axis of the rearranging V-belts. These rearranging V-belts may have a truncated-triangular cross-section, such as illustrated in FIGURES 12 and 13, or they may have a triangular or equivalent cross-section, such as illustrated in FIGURES 5 and 5a. The rearranging V-belts 113 are trained around adjustable tensioning guide roll 123 and support guide rolls 114, 115 and 116, which are grooved circumferentially, as indicated by the numeral 117, to properly tension and space the belts laterally.

The spaced, parallel rearranging V-belts 113 also pass over supporting guide rolls 118 and 119, which, in addition to carrying the plurality of rearranging V-belts 113, also carry an endless foraminous plastic or wire screen or belt 120. Intermediate supporting and guiding rolls 118a and 119a are provided to maintain the foraminous screen 120 and the plurality of rearranging V-belts 113 in a configuration which is substantially planar and horizontal in that space between rolls 118 and 114. The foraminous screen 120 is additionally trained around supporting guide roll 121, and is tensioned by adjustable tracking and tensioning roll 122. The V-belts 113 and screen 120 must be kept in contact so that no fluid stream will wash stray fibers underneath the land areas of the V-belts.

The direction of movement of the plurality of rearranging V-belts 113 and the foraminous screen 120, as well as the direction of movement of the card web 112, is indicated by the directional arrows in FIGURE 11.

As the plurality of rearranging V-belts 113 advance over the supporting roll 118 and are positioned upon the foraminous screen 120, the card web 112 is brought to a position lightly resting upon the belts in the position illustrated most clearly in FIGURE 12. The V-belts 113 and the foraminous screen 120 advance the card web to a position underlying a first series of spray jets or nozzles 124, which function, as indicated in FIGURES 12 and 5a, to exert fluid forces on the web and to separate or divide it into a plurality of continuous strands of fibers indicated by the numeral 125.

The rearrangement of the fibers may be assisted by vacuum means such as a suction box 126. FIGURE 11 illustrates preferred practice in which a plurality of fiber rearranging zones is employed; a second rearranging zone being constituted by the spray nozzles 127 and the suction box 128; and a third rearranging zone being constituted by the spray nozzles 129 and the suction box 130. Vacuum means indicated by the directional arrow 131 is employed in conjunction with conduit 132 to evacuate the suction boxes 126, 128 and 130.

The continuous strands 125 are carried by the foraminous screen 120 over the rolls 119 and 114 where they separate, with the strands being led to twisting and winding devices 83 of the conventional type. The foraminous screen 120 and the plurality of belts 113 return by different paths, as shown in FIGURE 11, and rejoin at roll 118 again to receive the card web 112.

In the event that the foraminous screen 120 and the plurality of belts 113 were integral, their paths will coincide and would be around a circuit determined by rolls 114, 115, 116, 123, and 118. The rollers 121 and 122 could then be conveniently omitted.

STARTING MATERIAL BETWEEN A STATIONARY SLOTTED REARRANGING PLATE AND A FORAMINOUS SUPPORT

FIGURES 14, 15 and 16 illustrate a form of the present invention in which a card web 320, coming from a conventional textile card (not shown) is drafted into a highly aligned card web 330 by passage through successive pairs of drafting rolls 321, 322 and 323 which progressively increase the alignment of the fibers of the card web 320. The card web 330 is then placed on a movable foraminous support screen such as an endless supporting screen 332 and is passed beneath a stationary slotted plate 335 where the fibers of the web are rearranged. This rearrangement is accomplished by fluid forces created by streams of fluid 338 issuing from spray nozzles 337. These streams flow through the slots 336 in the stationary plate 335 and are deflected laterally by the foraminous support 332 in the general manner described with reference to FIGURE 3.

Referring more particularly to FIGURE 14, a card web 330 wherein the fibers are highly aligned moves in the direction indicated by arrow 331 and is supported by an endless foraminous plastic or wire support screen 332, which is trained around rollers 333 and 334, at least one of those rollers being a driving roller. A stationary slotted plate 335 is positioned directly above the upper reach of a portion of the foraminous support screen 332 and is spaced from screen 332 so as to permit the entry of web 330 therebetween. Slots 336 (see FIGURE 15) in the plate 335 define a plurality of elongated, straight, parallel rearranging regions. As can be best seen in FIGURE 15, the rearranging slots 336 are parallel to the direction of travel of the card web 330 moving as indicated by arrow 331.

A plurality of spray heads 337 is positioned above and adjacent the slotted rearranging plate 335 and are so directed toward the same that the spray 338 issuing therefrom is projected, in sequence, through slots 336 in the rearranging plate 335, then through card web 330 to rearrange the fibers therein into continuous strands, and ultimately through the foraminous support screen 332. Vacuum boxes 339 may be positioned beneath the upper run of the foraminous screen support 332 to assist in the formation of the strand-like product, and to enhance the distinctness and clarity thereof.

The strand-like product which is produced is indicated by the numeral 340. As can be seen in FIGURE 16, the strands 340 are formed beneath the land areas of stationary plate 335, whereas the fibers in the intervening zones are displaced laterally to positions below the lands to form the packed, bundled continuous strands 340. The strands 340 are then led to be twisted and/or bonded, as desired.

It is to be noted that the strands formed in the apparatus of FIGURES 14 through 16 are formed under the lands of the slotted plate 335. Compacting of the strands so formed can be accomplished by narrowing the width of these land areas by tapering and widening the slots 336 in the rearranging plate 335.

STARTING MATERIAL SUPPORTED UPON A FORAMINOUS MEMBER WITH VACUUM APPLIED TO ELONGATED PARALLEL ZONES

FIGURES 17 through 21 illustrate a machine in which the starting fibrous material is supported on a foraminous member, such as an endless wire screen, that passes over a means, such as a stationary slotted plate, through which vacuum is applied to the opposite side of the foraminous support member so as to define elongated parallel vacuum zones. In the preferred embodiment shown, the slots defined by the stationary plate are tapered so that they progressively narrow in width in the direction of travel of the fibrous layer which is being rearranged. With this machine, the packed, bundled continuous strands are rearranged directly over the slots through which a rearranging fluid passes under a relatively strong vacuum. In this form of the invention, the strand-like product which is produced is more compacted, stronger and denser than comparable products produced by the hydraulic rearrangement of other apparatus previously described and illustrated herein.

Referring more particularly to FIGURES 17 and 18, a card web 320 which is delivered from a conventional textile card (not shown) is drawn by successive pairs of drafting rolls 321, 322 and 323 into a card web 330 containing aligned fibers. The aligned card web 330 is moved in the direction of the arrow 342 by a supporting screen 343 which is carried and moved substantially continuously by the rollers 344 and 345, at least one of which rollers being a driver. Supporting screen 343 passes directly over a slotted plate 349, as shown most clearly in FIGURES 19–21. The slots 350 and land areas 351' of this plate can be traced by following the card web 330 (FIGURE 19) as it is progressively converted into a plurality of ribbons, then into partially rounded strands (FIGURE 20), and finally to more fully compacted strands 346 (FIGURE 21). The beginning of the various rearranging slots 350 is indicated in FIGURE 17 by dotted line 347, and the slots terminate at dotted line 348.

A plurality of spray heads 337 is positioned above the moving screen 343 and is so directed toward the same that the spray 338 issuing therefrom is projected, in sequence, through the card web 330, then against the foraminous supporting screen 343 to be laterally deflected thereon, and ultimately to pass through the slots 350 in the rearranging plate 349.

The rearranging plate 349 constitutes the upper surface of a vacuum box 351 which is positioned directly beneath the upper run of the foraminous screen support 343 to assist in the formation of the strand-like product and to enhance the distinctness and the clarity thereof.

Figure 20:
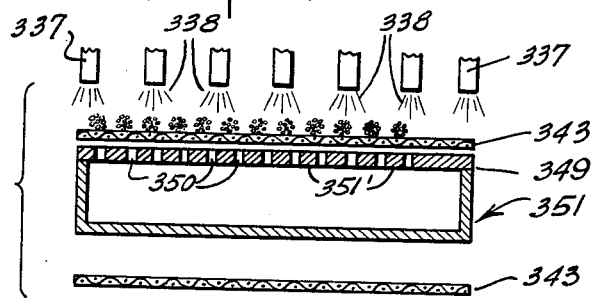
FIGURE 20 is a simplified diagrammatic cross-sectional view of the apparatus shown in FIGURE 17, taken on the line 20—20 in the direction indicated, with portions of the apparatus omitted for purposes of clarity, showing the continuous strand construction subsequent to the beginning of the rearrangement of the fibers.
Figure 21:
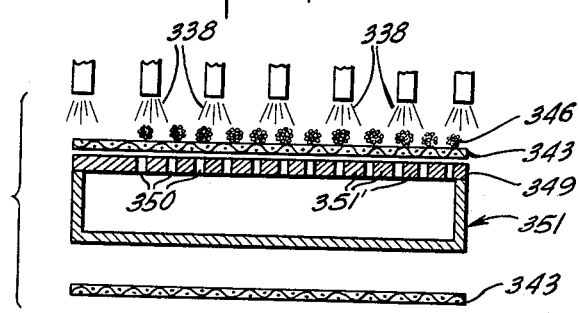
FIGURE 21 is a simplified diagrammatic cross-sectional view of the apparatus shown in FIGURE 17, taken on the line 21—21 in the direction indicated, with portions of the apparatus omitted for purposes of clarity, showing the continuous strands at a later stage of the rearrangement of the fibers to illustrate the compacting of the continuous strand.

As noted in FIGURES 19 through 21, the card web is initially positioned on the screen support in a unitary integral condition (FIGURE 19). As the card web advances under the fluid streams 338, it is split and divided thereby into a plurality of ribbons or partially rounded strands (FIGURE 20) due to the fact that the suction exerted through the slots 350 draws the fibers being arranged into positions directly over the suction-exerting slots 350.

As the ribbons or partially rounded strands continue to advance under the fluid streams 338, the width of the slots 350 narrows (see FIGURE 17) whereby the ribbons or partially rounded strands are drawn into more fully rounded and compacted strands 346.

It is to be noted that the slots 350, in addition to being tapered are also at an angle to the longitudinal axis of the strands being formed. Such an angularity provides for a slight but definite rolling or wrapping action on the strand being formed whereby a more uniform strand is obtained. It is, of course, obvious that the angularity could be directed in the opposite direction, that is downwardly in FIGURE 17, whereby a strand having an equal but opposite wrap is obtained. The extent of the angularity need not be very great and as little as 10° or 20° exerts a pronounced effect. Angles greater than 30° are utilizable but are not preferred for the purposes of the present invention.

If the median line or axis of the tapered slots is parallel to the direction of motion, that is, no angularity, there is a rolling or wrapping inwardly from both sides of the flat ribbon originally formed and a doubly-rolled effect is obtained in the finally compacted strand which, in an extreme case would begin to resemble the figure 8 lying on its side in cross-section rather than a zero figure.

The strands 346 are then advanced beyond the end of the vacuum box 351 and are led to conventional twisting devices 353 whereby they are twisted into yarns. If desired, the strand-like products 346 may be left in their originally aligned condition and need not be twisted. In such a case, however, the twisting devices 353 are preferably replaced with adhesive bonding devices of a conventional type.

PAPERMAKING TECHNIQUES

The fibrous layer to be rearranged in accordance with any of the various embodiments of this invention is preferably constituted of a web of textile length fibers which has been treated by carding and perhaps one drafting operation to substantially align the fibers to the degree previously indicated. The degree of alignment desired in a particular case depends to a considerable extent upon the length of the fibers in the fibrous layer. As already indicated above, alignment is of greatest importance in the treatment of fibrous layers containing a substantial proportion of long fibers, e.g., fibers of greater than 1¼ inches to about 2½ inches or longer. On the other hand, as the proportion of short textile length fibers increases, then the need for alignment of the fibers is considerably reduced and can sometimes be dispensed with.

Papermaking fibers having a length down to about one-eighth of an inch, for example, may also be incorporated in the fibrous layers which are rearranged to form the ribbons, strands, rovings, yarns, and other yarn-like products in accordance with the invention. When the papermaking fibers are to be mixed with short length textile fibers (less than ¾ inch, for example) and initial alignment is of secondary significance, the two types of fibers may be mixed together, for example, and simultaneously deposited upon a conventional draining papermaker's wire. In this event, the aqueous slurry layer which is formed may be rearranged to form strands by the present invention while the layer still contains a sufficient proportion of water as to be non-self-supporting. When this is done, the advantages of rapid and efficient rearrangement set forth in the commonly assigned, copending application of Carlyle Harmon and Frank Kalwaites, filed June 17, 1957, and assigned Serial Number 666,009, now U.S. Patent No. 3,042,576, are obtained.

The foregoing principles are illustrated in FIGURE 22 wherein numeral 380 designates a standard head box containing a dilute aqueous suspension of papermaking fibers which are agitated in any suitable conventional manner. The dilute suspension of fibers in the head box 380 is supplied through a valved conduit 387 to a mixing tank 388 supplied with baffles 389.

The textile length fibers, say about ½ inch in length, for example, are placed in suspension in a container 390 which may also contain other materials which it is desired to incorporate in the strand or yarn which is to be produced. This suspension is supplied from container 390 through downspout 391 to the mixing tank 388. In this manner, an intimately mixed suspension of papermaking and textile length fiber is supplied to the forming zone 394 above the conventional sluice 395.

The aqueous suspension drains onto a foraminous carrier wire 396 to produce a wet, non-self-supporting fibrous layer 397 which is continuously advanced into a rearranging zone at the right hand end of FIGURE 22, similar to that shown in FIGURE 6, where the fibrous layer is rearranged by fluid forces and strand-like products are continuously produced. Since the fibrous layer is wet to the extent that it cannot support itself, the fibers are subjected to hydraulic rearrangement irrespective of whether the rearranging force is supplied by a gas or a liquid. The numerals in FIGURE 22 which coincide with those used in FIGURE 6 denote identical parts. In this embodiment of the invention, paper fibers may replace substantial proportions of textile fibers in strands and ribbons, and the high speed and efficiency and other advantages of papermaking processes may be employed in strand production.

The amount by weight of the papermaking fibers which is included with the textile length fibers depends upon many factors, notably the type of strand or yarn which is desired, the properties and characteristics thereof, and the purposes and use for which such products are intended. Under normal circumstances, it has been found that from a negligible amount up to about 50% by weight has been found satisfactory. However, where the circumstances are such that increased amounts of shorter fibers can be tolerated, the upper limit may be extended to 100% by weight. The strands resulting from such papermaking techniques may be twisted or may be untwisted and bonded, depending upon the above-stated factors and the percentage of shorter fibers included in the product.

When it is desired to form laminated or composite constructions by incorporating papermaking fibers in a fibrous layer containing aligned textile length fibers, it is preferred to initially produce a carded aligned web of the textile fibers and then to place this preformed web upon the screen before the layer of papermaking fibers is deposited.

Apparatus for this purpose is shown diagrammatically in FIGURE 24. In that figure, the papermaking wire 396 passes beneath the sluice 395 at the forward end of the tank 388 and the wire then advances, for example, through the fiber rearranging structure of FIGURE 22. However, a preformed web of aligned textile fibers 403 is deposited upon the papermaking wire 396 before it reaches the sluice and, as a result, the fibrous material which is rearranged for strand production is an intimate mixture 404 of papermaking fibers and textile fibers.

The apparatus disclosed in FIGURE 24 may be further modified whereby a second web of aligned textile fibers 403 may be deposited on top of the intimate mixture 404 of papermaking fibers and textile fibers. Such a modification basically provides for a sandwich-type construction in which the upper and lower surface webs primarily comprise aligned fibers and in which the intermediate layer comprises the shorter papermaking fibers.

The strands and yarns of the present invention may be fabricated to form woven, knitted or braided textiles of various constructions. Such textile fabrics may be subjected to various conventional textile treatments such as scouring, dyeing, bleaching, printing, etc. If desired the card web may be dyed or otherwise treated before strand or yarn formation or the strand or yarn may be dyed or otherwise treated after formation.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

Example 1

The starting material is a 36" wide card web of viscose rayon fibers weighing about 200 grains per square yard and containing fibers having a length of about 1 9/16 inches and a denier of 1½. The card web is drafted by being passed through three pairs of conventional drafting rollers having a total draft of 2. The degree of alignment of the fibers in the long direction of the web is about 95%. The card web is advanced at a velocity of about 40 yards per minute through the apparatus disclosed in FIGURES 6 through 8. The treating fluid is water at room temperature.

The card web is subdivided into 144 separate strands which are somewhat elliptical in cross-section. The strands possess an average dry weight of about 1.39 grains per linear yard of length. The strands are twisted so that the resulting yarns contain 10 turns per inch.

The resulting yarn is capable of being used in weaving operations. The yarn has excellent uniformity and substantially constant linear density.

*Example II*

The procedures set forth in Example I are followed substantially as set forth therein with the exception that the starting materials comprise a blend of 50% by weight of the viscose rayon fibers used in Example I and 50% by weight of cotton having a staple length of 1¼ inches, with a degree of parallelism of 90%.

The resulting yarn is comparable to the all-viscose-rayon yarn obtained in Example I, taking into account the expected differences due to the substitution of 50% of the viscose by cotton. The yarn has excellent uniformity and substantially constant linear density.

*Example III*

The procedures of Example I are followed substantially as set forth therein except that the card web is more highly aligned in that example. The degree of alignment of the fibers in the card web of the present example is determined to be approximately 90%.

The resulting product is inferior to the products formed in Examples I and II and is processed less easily in that there are more connecting fibers between the strands produced on the apparatus. The yarn has excellent uniformity and substantially constant linear density.

When the degree of alignment is reduced to 80%, strands are still formed but the number of interconnecting fibers increases. The resulting strand is satisfactory for further processing but is not as smooth and desirable as the product of Example I.

*Example IV*

The procedures set forth in Example I are followed substantially as set forth therein with the exception that the apparatus illustrated in FIGURES 9 and 10 is used instead of the apparatus illustrated in FIGURES 6 through 8.

The resulting product is basically similar to the product obtained in Example I except that it is noted that when the openings in the drum are not sufficiently closely spaced, there is a tendency of many interconnecting fibers to be present and to prevent a ready separation of the strands. The yarn has excellent uniformity and substantially constant linear density.

*Example V*

The procedures set forth in Example IV are followed substantially as set forth therein with the exception that the card web is more highly drafted so that the degree of fiber alignment is on the order of about 90%.

The resulting product is not as satisfactory as the product of Example IV.

*Example VI*

The procedures of Example I are followed substantially as set forth therein with the exception that the apparatus disclosed in FIGURES 11 through 13 is used to replace the apparatus of FIGURES 6 through 8.

The resulting product, as it leaves the rearranging belts is sufficiently smooth as to be capable of further handling, such as twisting, but it is noted that the cross-section is not as smoothly elliptical as the product of the apparatus of FIGURES 6 through 8.

*Examples VII, VIII and IX*

The procedures of Example I are carried out substantially as set forth therein with the apparatus of FIGURES 6 through 8 with the exception that the starting materials comprise webs having different weights as follows: Example VII is 250 grains per square yard; Example VIII is 300 grains per square yard; and Example IX is 350 grains per square yard. In the latter two examples, the twist in the yarns is reduced to 8 turns per inch.

The resulting products are basically similar to the products of Example I with the weights of the strands increasing to proportionately greater amounts. The yarns have excellent uniformity and substantially constant linear density.

*Examples X, XI and XII*

The procedures of Example I are followed substantially as set forth therein with the exception that different lengths of fibers are used as follows: Example X is ¾; Example XI is 1¼; and Example XII is 1½ inches. In these instances, the degree of alignment of the fibers is about 80%, 85% and 90%, respectively.

The resulting products are comparable to the product of Example I but it is noted that the shorter the fiber which is used, the smoother is the strand with fewer interconnecting cross-fibers thus indicating that the need for higher alignment is greater for the longer lengths of fibers. The strands have excellent uniformity and substantially constant linear density.

*Examples XIII, XIV and XV*

The procedures of Example I are followed substantially as set forth therein with the exception that the denier of the fibers is changed as follows: the denier in Example XIII is 1; the denier in Example XIV is 2; and the denier in Example XV is 3.

The resulting products are comparable to the product of Example I but it is noted that the heavier the fiber which is used, the greater is the hydraulic force required to rearrange the fibers. The yarns have excellent uniformity and substantially constant linear density.

*Example XVI*

The procedures of Example I are followed substantially as set forth therein with the exception that the strands produced are not twisted but are adhesively bonded with viscose (regenerated cellulose).

The resulting bonded strand is capable of being used in textile fabricating operations such as weaving, knitting and braiding. The strand has excellent uniformity and substantially constant linear density.

*Example XVIII*

The procedures of Example I are followed substantially as set forth therein with the exception that the fibers used are viscose rayon fibers having a length of about 1⅛ inches and a denier of 1½. The degree of parallelism or alignment of the fibers is about 70%. It is noted that there is an increase in the number of crosslinking fibers between the strands produced when using these fibers. A slitting means, such as rotating cutter wheels, is used to separate the strands at the conclusion of the rearranging process.

The resulting strand is twisted into yarn and is capable of being used in the weaving of fabrics.

Although several specific examples of the inventive concept have been described, the same should not be construed as limited thereby nor to the specific features and particular details mentioned therein, but to include various other features and details as set forth in the claims appended hereto. It is understood that any suitable changes, modifications and variations may be made without departing from the spirit and scope of the inventive concept.

What is claimed is:

1. The method of converting a fibrous layer containing fibers capable of movement under the influence of an applied liquid force into a plurality of unitary strand products which comprises: positioning the fibrous layer adjacent to means defining spaced, generally parallel, permeable elongated zones and means defining foramina of smaller dimensions than the width of said zones, passing streams of liquid between said zone defining means, through said layer and said foramina defining means to deflect said streams laterally in generally opposite directions in said zones, said directions having components parallel to the median section of said fibrous layer and perpendicular to the axis of the elongated zone in which the deflection occurs, and directing streams of said deflected liquid in opposed directions from adjacent pairs of said zones against the group of fibers lying between said adjacent zones to subdivide said layer into a plurality of generally parallel, substantially separate, continuous groups of fibers.

2. The method of converting a fibrous layer containing fibers capable of movement under the influence of an applied liquid force into a plurality of unitary strand products which comprises: positioning the fibrous layer between means defining spaced, generally parallel, permeable elongated zones and means defining foramina of smaller dimensions than the width of said zones, passing streams of liquid in sequence between said zone-defining means, through said layer and said foramina-defining means to deflect said streams lateral in generally opposite directions in said zones, said directions having components parallel to the median section of said fibrous layer and perpendicular to the axis of the elongated zone in which the deflection occurs, and directing streams of said deflected liquid in opposed directions from adjacent pairs of said zones against the group of fibers lying between said adjacent zones to subdivide said layer into a plurality of generally parallel, substantially separate, continuous groups of fibers underlying said zone-defining means.

3. A continuous method of converting a fibrous layer containing fibers capable of movement under the influence of an applied liquid force into a plurality of unitary strand products which comprises: continuously introducing the fibrous layer between means defining spaced, generally parallel, permeable elongated zones and continuously moving support means defining foramina of smaller dimensions than the width of said zones, passing streams of liquid in sequence between said zone-defining means, through said layer, and through said foramina-defining means to deflect said streams laterally in generally opposite directions in said zones, said directions having components parallel to the median section of said fibrous layer and perpendicular to the axis of the elongated zone in which the deflection occurs, and directing streams of said deflected liquid in opposed directions from adjacent pairs of said zones against the group of fibers lying between said adjacent zones to subdivide said layer into a plurality of generally parallel, substantially separate, continuous groups of fibers underlying said zone-defining means.

4. A continuous method of converting a fibrous layer containing fibers capable of movement under the influence of an applied liquid force into a plurality of unitary strand products which comprises: continuously introducing the fibrous layer between continuously moving means defining spaced, generally parallel, permeable elongated zones and continuously moving support means defining foramina of smaller dimensions than the width of said zones, passing streams of liquid in sequence between said zone-defining means, through said layer and said foramina-defining means to deflect said streams laterally in generally opposite directions in said zones, said directions having components parallel to the median section of said fibrous layer and perpendicular to the axis of the elongated zone in which the deflection occurs, and directing streams of said deflected liquid in opposed directions from adjacent pairs of said zones against the group of fibers lying between said adjacent zones to subdivide said layer into a plurality of generally parallel, substantially separate, continuous groups of fibers underlying said zone-defining means.

5. Apparatus for the continuous production of strand-like products from a layer of fibers which comprises: endless, movable, foraminous supporting means, said supporting means having a surface free of obstacles to movement of said fibers therealong in response to applied fluid forces; a plurality of rearranging belts adjacent said foraminuos means and defiining a plurality of spaced, generally parallel, elongated, open zones; means to pass a fluid in sequence between said rearranging belts and then through said foraminous supporting means; and means to move said foraminous supporting means in the general direction of the length of said permeable zones so that successive areas of said foraminous means are struck by said fluid.

6. Apparatus for the continuous production of strand-like products from a layer of fibers which comprises: endless, movable, foraminous supporting means, said supporting means having a surface free of obstacles to movement of said fibers therealong in response to applied fluid forces; a plurality of endless rearranging belts spaced from said foraminous means and defining a plurality of spaced, generally parallel, elongated, open zones; means to pass a fluid in sequence between said rearranging belts and then through said foraminous supporting means; and means to move said foraminous supporting means and rearranging belts in the general direction of the length of said permeable zones so that successive areas of said foraminous means are struck by said fluid.

7. Apparatus for the continuous production of strand-like products from a layer of fibers which comprises: a rotatably mounted drum having a plurality of rows of perforations through its outer wall, said rows being generally parallel to the ends of the drum, the individual perforations of said rows being relatively closely spaced in the direction of drum rotation with said rows being more widely spaced in the direction at right angles to drum rotation than the spacing between adjacent individual perforations of said rows in the direction of drum rotation; means to rotate said drum; an endless, movable, flexible, foraminous belt, said foraminous belt havin a surface free of obstacles to movement of said fibers therealong in response to applied liquid forces; means to guide said foraminous belt around a portion of said drum adjacent the outer surface thereof; means to move said belt with the rotating drum; means to introduce a fibrous layer between said drum and belt to form a moving sandwich; liquid spray means positioned inside said rotating drum to direct a liquid in sequence through said perforated drum, said fibrous layer, and said foraminous belt; and means to remove the resulting strand products from between said rotating drum and belt, the individual perforations in each of said rows being closely spaced to each other so as to provide relatively small land areas in the longitudinal direction between adjacent perforations.

8. Apparatus for the continuous production of strand-like products from a layer of fibers which comprises: endless, movable, foraminous supporting means, said supporting means having a surface free of obstacles to movement of said fibers therealong in response to applied liquid forces; a plurality of endless movable, rearranging belts adjacent said foraminous means and defining a plurality of spaced, generally parallel, elongated, open zones; liquid spray means to direct a liquid in sequence between said rearranging belts and then through said foraminous supporting means; means to move said foraminous supporting means and rearranging belts in the general direction of the length of said permeable zones so that successive areas of said foraminous means are struck by said liquid; and vacuum means adjacent said foraminous supporting means on the opposite side thereof from said liquid spray means, to assist in passing liquid through said fibrous layer and said supporting means.

9. The method of converting a fibrous layer containing fibers capable of movement under the influence of an applied liquid force into a plurality of unitary strand products which comprises: positioning the fibrous layer adjacent to means defining spaced, generally parallel, permeable elongated zones and means defining foramina of smaller dimensions that the width of said zones, and passing streams of liquid between said zone defining means through said layer and said foramina defining means to deflect said streams laterally in generally opposite directions in said zones, said directions having components parallel to the median section of said fibrous layer and perpendicular to the axis of the elongated zone in which the deflection occurs, and thereby subdivide said layer into a plurality of generally parallel, substantially separate, continuous groups of fibers.

10. The method of converting a fibrous layer containing fibers capable of movement under the influence of an applied liquid force into a plurality of unitary strand products which comprises: positioning the fibrous layer adjacent to means defining spaced, generally parallel, permeable elongated zones and means defining foramina of smaller dimensions than the width of said zones, passing streams of liquid between said zone defining means through said layer and said foramina defining means to deflect said streams laterally in generally opposite directions in said zones, said directions having components parallel to the median section of said fibrous layer and perpendicular to the axis of the elongated zone in which the deflection occurs, and thereby subdivide said layer into a plurality of generally parallel, substantially separate, continuous groups of fibers, and assisting the passage of said liquid through the fibrous layer by applying vacuum to the fibrous layer on the side thereof opposite the source of said liquid.

11. The method of converting a fibrous layer containing fibers capable of movement under the influence of an applied liquid force into a plurality of unitary strand products which comprises: positioning the fibrous layer between means defining spaced, generally parallel, permeable elongated zones and means defining foramina of smaller dimensions than the width of said zones, and passing streams of liquid in sequence between said zone-defining means, through said layer and said foramina-defining means to deflect said streams laterally in generally opposite directions in said zones, said directions having components parallel to the median section of said fibrous layer and perpendicular to the axis of the elongated zone in which the deflection occurs, and thereby subdivide said layer into a plurality of generally parallel, substantially separate, continuous groups of fibers underlying said zone-defining means.

12. A continuous method of converting a fibrous layer containing fibers capable of movement under the influence of an applied liquid force into a plurality of unitary strand products which comprises: continuously introducing the fibrous layer between means defining spaced, generally parallel, permeable elongated zones and continuously moving support means defining foramina of smaller dimensions than the width of said zones, and passing streams of liquid in sequence between said zone-defining means, through said layer, and through said foramina defining means to deflect said streams laterally in generally opposite directions in said zones, said directions having components parallel to the median section of said fibrous layer and perpendicular to the axis of the elongated zone in which the deflection occurs, and thereby subdivide said layer into a plurality of generally parallel, substantially separate, continuous groups of fibers underlying said zone-defining means.

13. A continuous method of converting a fibrous layer containing fibers capable of movement under the influence of an applied liquid force into a plurality of unitary strand products which comprises: continuously introducing the fibrous layer between continuously moving means defining spaced, generally parallel, permeable elongated zones and continuously moving support means defining foramina of smaller dimensions than the width of said zones, and passing streams of liquid in sequence between said zone-defining means, through said layer and said foramina-defining means to deflect said streams laterally in generally opposite directions in said zones, said directions having components parallel to the median section of said fibrous layer and perpendicular to the axis of the elongated zone in which the deflection occurs, and thereby subdivide said layer into a plurality of generally parallel, substantially separate, continuous groups of fibers underlying said zone-defining means.

14. Apparatus for the continuous production of strand-like products from a layer of fibers which comprises: endless, movable foraminous supporting means, said supporting means having a surface free of obstacles to movement of said fibers therealong in response to applied liquid forces; a drum containing a plurality of spaced, generally parallel rows of perforations adjacent said foraminous means and defining a plurality of spaced, generally parallel, elongated, open zones, the individual perforations of said rows being relatively closely spaced in the direction of drum rotation with said rows being more widely spaced in the direction at right angles to drum rotation than the spacing between adjacent individual perforations of said rows in the direction of drum rotation; means to pass a liquid through said apertured drum and through said foraminous supporting means; and means to move said foraminous supporting means in the general direction of the length of said permeable zones so that successive areas of said foraminous means are struck by said liquid.

15. Apparatus for the continuous production of strand-like products from a layer of fibers which comprises: endless, movable foraminous supporting means, said supporting means having a surface free of obstacles to movement of said fibers therealong in response to applied liquid forces; a drum containing a plurality of spaced, generally parallel rows of perforations adjacent said foraminous means and defining a plurality of spaced, generally parallel, elongated, open zones, the individual perforations of said rows being relatively closely spaced in the direction of drum rotation with said rows being more widely spaced in the direction at right angles to drum rotation than the spacing between adjacent individual perforations of said rows in the direction of drum rotation; means to pass a liquid in sequence through said apertured drum and then through said foraminous supporting means; means to move said foraminous supporting means in the general direction of the length of said permeable zones so that successive areas of said foraminous means are struck by said liquid; and vacuum means adjacent said foraminous supporting means to assist in the removal of liquid from the strand-like products.

16. Apparatus for the continuous production of strand-like products from a layer of fibers which comprises: endless, movable foraminous supporting means, said supporting means having a surface free of obstacles to movement of said fibers therealong in response to applied liquid forces; a plate member containing a plurality of spaced, generally parallel rows of perforations adjacent said foraminous means and defining a plurality of spaced, generally parallel, elongated, open zones, the individual perforations of said rows being relatively closely spaced in the direction of movement of the layer of fibers with said rows being more widely spaced in the direction at right angles to the direction of movement of the layer of fibers than the spacing between adjacent individual perforations of said rows in the direction of movement of the layer of fibers; means to pass a liquid through said apertured plate member and through said foraminous supporting means; and means to move said foraminous supporting means in the general direction of the length of said permeable zones so that successive areas of said foraminous means are struck by said liquid.

17. Apparatus for the continuous production of strand-like products from a layer of fibers which comprises:

endless, movable foraminous supporting means, said supporting means having a surface free of obstacles to movement of said fibers therealong in response to applied liquid forces; a plate member containing a plurality of spaced, generally parallel elongated slots adjacent said foraminous means and defining a plurality of spaced, generally parallel, elongated, open zones; means to pass a liquid in sequence through the slots of said slotted plate member and through said foraminous supporting means; and means to move said foraminous supporting means in the general direction of the length of said permeable zones so that successive areas of said foraminous means are struck by said liquid.

18. Apparatus for the continuous production of strand-like products from a layer of fibers which comprises: endless, movable foraminous supporting means, said supporting means having a surface free of obstacles to movement of said fibers therealong in response to applied liquid forces; a plate member containing a plurality of spaced, generally parallel elongated slots adjacent said foraminous means and defining a plurality of spaced, generally parallel, elongated, open zones; means to pass a liquid in sequence through the slots of said slotted plate member and then through said foraminous supporting means; means to move said foraminous supporting means in the general direction of the length of said permeable zones so that successive areas of said foraminous means are struck by said liquid; and vacuum means adjacent said foraminous supporting means to assist in the passage of the liquid through the layer of fibers.

References Cited in the file of this patent

UNITED STATES PATENTS

| | | |
|---|---|---|
| 1,484,902 | Paige | Feb. 26, 1924 |
| 1,765,571 | Edson et al. | June 24, 1930 |
| 2,274,423 | Miller | Feb. 24, 1942 |
| 2,274,424 | Miller | Feb. 24, 1942 |
| 2,274,425 | Miller | Feb. 24, 1942 |
| 2,363,470 | Lannan et al. | Nov. 21, 1944 |
| 2,862,251 | Kalwaites | Dec. 2, 1958 |

FOREIGN PATENTS

| | | |
|---|---|---|
| 25,629 | Denmark | Feb. 18, 1920 |
| 21,915 | Great Britain | of 1902 |
| 24,136 | Great Britain | of 1902 |
| 17,199 | Great Britain | of 1903 |

UNITED STATES PATENT OFFICE
CERTIFICATE OF CORRECTION

Patent No. 3,135,023                        June 2, 1964

Frank Kalwaites

It is hereby certified that error appears in the above numbered patent requiring correction and that the said Letters Patent should read as corrected below.

Column 2, line 3, for "deirable" read -- desirable --; column 3, lines 16 and 17, for "hexamethylene" read -- (hexamethylene --; column 21, line 23, for "lateral" read -- laterally --; column 22, line 39, for "havin" read -- having --; column 23, line 4, for "that" read -- than --.

Signed and sealed this 13th day of October 1964.

(SEAL)
Attest:

ERNEST W. SWIDER
Attesting Officer

EDWARD J. BRENNER
Commissioner of Patents